(12) United States Patent
Brouwer et al.

(10) Patent No.: US 9,533,636 B2
(45) Date of Patent: Jan. 3, 2017

(54) REMOTE MODULAR EQUIPMENT CENTER ARCHITECTURE

(71) Applicant: The Boeing Company, Chicago, IL (US)

(72) Inventors: Todd B. Brouwer, Duvall, WA (US); Thomas R Hasenoehrl, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 537 days.

(21) Appl. No.: 14/052,450

(22) Filed: Oct. 11, 2013

(65) Prior Publication Data

US 2015/0102663 A1    Apr. 16, 2015

(51) Int. Cl.
| | |
|---|---|
| *B60L 1/00* | (2006.01) |
| *B60L 3/00* | (2006.01) |
| *H02G 3/00* | (2006.01) |
| *B60R 16/023* | (2006.01) |
| *H02J 4/00* | (2006.01) |
| *H02J 13/00* | (2006.01) |

(52) U.S. Cl.
CPC ............. *B60R 16/0238* (2013.01); *H02J 4/00* (2013.01); *H02J 13/0096* (2013.01); *B64D 2221/00* (2013.01)

(58) Field of Classification Search
CPC .... B60R 16/0238; B64D 2221/00; H02J 4/00; H02J 13/0096
USPC .......................................................... 307/9.1
See application file for complete search history.

(56) References Cited

U.S. PATENT DOCUMENTS

| | | | |
|---|---|---|---|
| 4,800,328 A | 1/1989 | Bolger et al. | |
| 5,386,363 A | 1/1995 | Haak et al. | |
| 5,442,280 A | 8/1995 | Baudart | |
| 5,936,318 A | 8/1999 | Weiler et al. | |
| 6,313,623 B1 | 11/2001 | Kojovic et al. | |
| 6,664,656 B2 * | 12/2003 | Bernier | B64D 41/00 244/60 |
| 6,822,547 B2 | 11/2004 | Saito et al. | |
| 7,005,995 B2 | 2/2006 | Hornsby et al. | |
| 7,227,442 B2 | 6/2007 | Skendzic | |
| 7,525,785 B2 | 4/2009 | Rawlings | |

(Continued)

FOREIGN PATENT DOCUMENTS

| | | |
|---|---|---|
| EP | 0 275 346 | 7/1988 |
| EP | 1 504 315 | 11/2003 |

(Continued)

OTHER PUBLICATIONS

SAE 2004-01-3159, Advanced Vehicle Wire Health for the 21st Century, Nov. 2-4, 2004.

(Continued)

*Primary Examiner* — Carlos Amaya

(57) ABSTRACT

A plurality of remote module equipment centers (RMECs) distributed throughout a vehicle to aggregate sensor and control information into localized areas of the vehicle. The RMECs provide power and bidirectional communications to vehicle subsystems thereby localizing the computing and networking functions close to the associated electrical components of the subsystem. In one or more configurations, the RMECs are utilized outside the pressure vessel of an aircraft to minimize the routing distance and size of the wire bundle passing through the pressure vessel.

20 Claims, 34 Drawing Sheets

(56) References Cited

U.S. PATENT DOCUMENTS

| | | | |
|---|---|---|---|
| 7,532,000 | B2 | 5/2009 | Kovach et al. |
| 7,922,117 | B2 | 4/2011 | Wavering et al. |
| 7,948,208 | B2 | 5/2011 | Partovi et al. |
| 7,952,322 | B2 | 5/2011 | Partovi et al. |
| 8,031,458 | B2 | 10/2011 | Braden et al. |
| 8,423,305 | B2 | 4/2013 | Thomas et al. |
| 2010/0063754 | A1 | 3/2010 | Thomas et al. |
| 2010/0102625 | A1 | 4/2010 | Karimi et al. |
| 2011/0181295 | A1 | 7/2011 | Haugen et al. |

FOREIGN PATENT DOCUMENTS

| | | |
|---|---|---|
| EP | 1 973 018 | 9/2008 |
| EP | 2 442 425 | 4/2012 |

OTHER PUBLICATIONS

Schweitzer, et al., "Real Time Synchrophasor Applications in Power System Control and Protection", 2010, pp. 1-5.
IEEE Standard for Synchrophasor Measurements for Power Systems, IEEE Power and Energy Society, Dec. 28, 2011, pp. 1-61.
IEEE Standard for Synchrophasor Data Transfer for Power Systems, IEEE Power and Energy Society, Dec. 28, 2011, pp. 1-53.
Chawla, Neha, et al., "State of the Art in Inductive Charging for Electronic Appliances and its Future in Transportation", 2012 Florida Conference on Recent Advances in Robotics, May 10-11, 2012, pp. 1-7.
Dalessandro, et al., "A Novel Isolated Current Sensor for High-Performance Power Electronics Applications", Swiss Federal Institute of Technology Zurich, 2006, pp. 559-566.
Dalessandro, et al., "Online and Offline Isolated Current Monitoring of Parallel Switched High-Voltage Multi-Chip IGBT Modules", High Voltage Technology Laboratory, Zurich, Switzerland, 2008, pp. 2600-2606.
SAE AS4805—Solid State Power Controller; Dec. 12, 2014.
Karrer, Nicholas et al., "A New Current Measuring Principle for Power Electronic Applications", 1999, pp. 279-282.
Karrer, Nicholas et al., "PCB Rogowski Coils for High di/dt Current Measurement", 2000, pp. 1296-1301.
Airbus Electrical Load Analysis FAST, Dec. 2006.
Airbus Electrical Sizing Thesis, Aug. 2009.
Lifring, Mark, "Optimization of Launch Vehicle Energy Storage", SAE 2002-01-3207.
Waffenschmidt, "Inductive Wireless Power Transmission", IEEE Energy Conversion Congress & Exposition, Phoenix, AZ Sep. 17-22, 2011.
Liscouet-Hanke, Susan, "A Model Based Methodology for Integrated Preliminary Sizing and Analysis of Aircraft Power System Architectures", Sep. 2008.
Horowitz, Stanley, et al., "Power System Relaying", John Wiley and Sons, New York, 1992.
Clark, Edith, "Circuit Analysis of A-C Power Systems", vol. 1, John Wiley and Sons, New York, 1943.
International Search Report and Written Opinion dated Dec. 5, 2014 from International Application No. PCT/US2014/055188.

\* cited by examiner

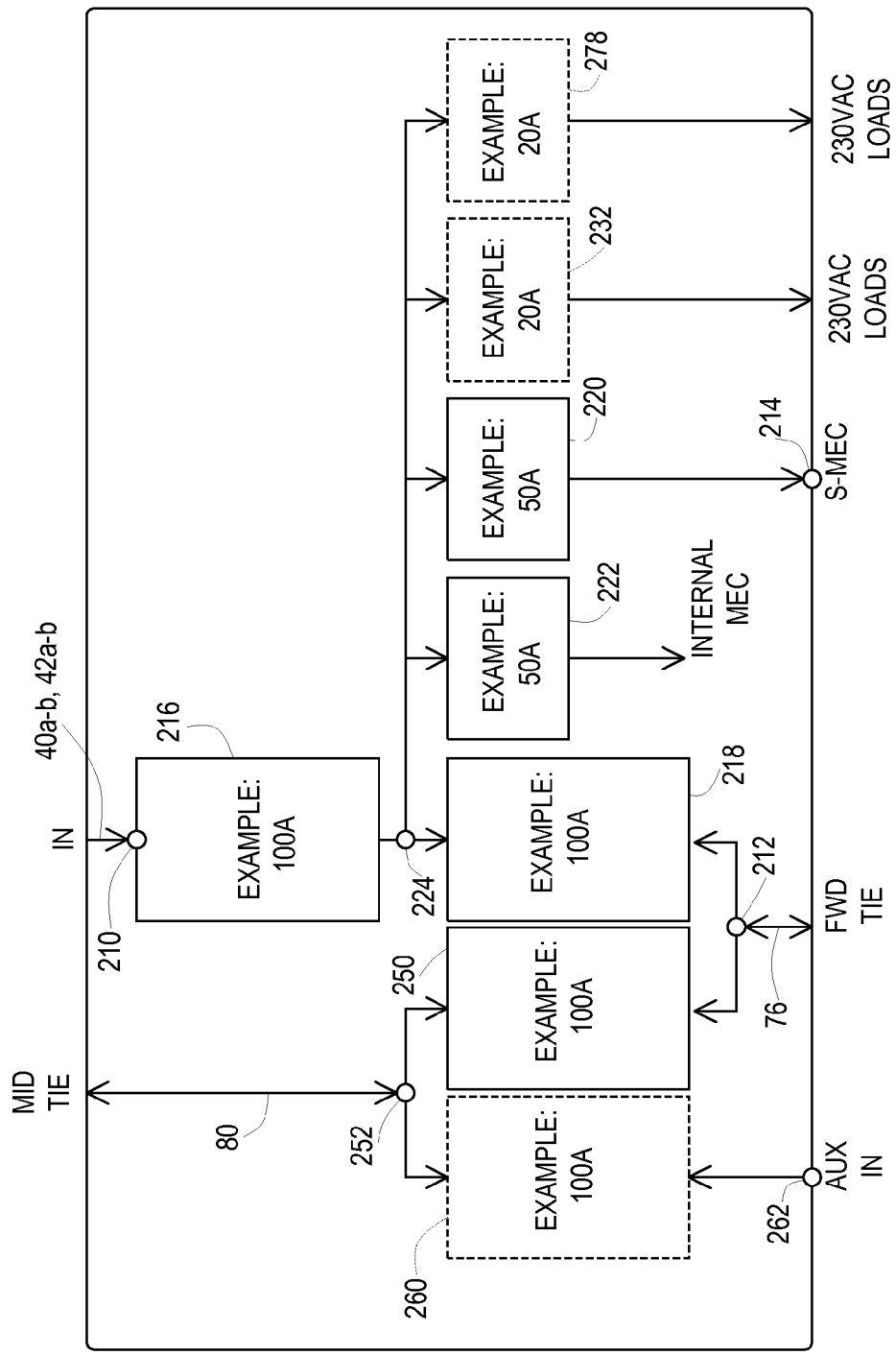

REMOTE MODULAR EQUIPMENT CENTER ARCHITECTURE

CROSS REFERENCE TO RELATED APPLICATIONS

The present U.S. Nonprovisional application is related to co-pending U.S. Nonprovisional application entitled "MODULAR EQUIPMENT CENTER DISTRIBUTED PRIMARY POWER ARCHITECTURE" Ser. No. 14/052,327, U.S. Nonprovisional application entitled "MODULAR EQUIPMENT CENTER ZONAL STANDALONE POWER SYSTEM CONTROL ARCHITECTURE" Ser. No. 14/052,396, U.S. Nonprovisional application entitled "MODULAR EQUIPMENT CENTER DISTRIBUTED INDEPENDENT PROTECTIONS" Ser. No. 14/052,387, U.S. Nonprovisional application entitled "MODULAR EQUIPMENT CENTER SOLID STATE PRIMARY POWER SWITCHING NETWORK" Ser. No. 14/052,426, U.S. Nonprovisional application entitled "MODULAR EQUIPMENT CENTER DISTRIBUTED EQUIPMENT PACKAGING TRUSS" Ser. No. 14/052,304, U.S. Nonprovisional application entitled "MODULAR EQUIPMENT CENTER INTEGRATED TRUSS SENSORS" Ser. No. 14/052,279, and U.S. Nonprovisional application entitled "MODULAR EQUIPMENT CENTER LIGHTNING THREAT REDUCTION ARCHITECTURE" Ser. No. 14/052,292, which are all incorporated herein by reference in their entirety, having been filed concurrently with the present application.

TECHNICAL FIELD

The field of the embodiments presented herein is directed toward modular vehicle architectures, and more particularly, to distributed power and data aircraft architectures.

BACKGROUND

Most commercial aircraft have one or more centralized equipment bays for housing electrical power and communications equipment. Power and data are distributed from the centralized equipment bays throughout the entire aircraft to control all functions within the aircraft. The centralized equipment bays are displaced from one another across one or more section breaks in the aircraft. Typically, one centralized equipment bay is in a forward section and the other is in an aft section of the aircraft.

Generators driven by the main propulsive engines generate three-phase primary electrical power for the aircraft. The primary power is first routed to the aft equipment bay and then through the aircraft to the forward equipment bay. The primary power is then centrally configured for distribution throughout the rest of the aircraft to service various equipment loads. Centralized bus power control units within the equipment bays control all power functions throughout the aircraft. After the centralized conversions, secondary power is routed to remote power distribution units to service the equipment loads throughout the aircraft or directly to equipment loads.

All functions of the aircraft are reliant upon the centralized power and communications equipment. If either the power or data from the centralized equipment bays is severed, the receiving equipment goes into a standby state where it becomes difficult for the flight crew to determine the state of the corresponding systems. Also, the backbone of the communication network must be oversized because of the high bandwidth demands during peak times to and from the centralized communication equipment.

Composite aircraft do not have an aluminum chassis to serve as the return current path or network. Consequently, either a complex network of wires must be added to provide a current return path for all circuits or dedicated return wires must be added for each equipment load. For example, conductive wiring must be added that extend longitudinally along the length of the composite aircraft as well as laterally across the width of the composite aircraft, as described in U.S. Pat. No. 8,031,458 entitled CURRENT RETURN NETWORK, and which is herein incorporated by reference in its entirety. This solution adds cost, manufacturing and maintenance complexity, increased voltage drop, and undesirable weight to the composite aircraft. Thus, attempts to reduce weight in composite aircraft by minimizing wiring have been counteracted by the need for increased lightning protection components and other reasons in composite aircraft.

The aluminum chassis (e.g. components that make up the frame or skin or combination thereof) of traditional aircraft, as well as any other conductive metal structure of the aircraft, is tied together to form a current return network for returning a voltage reference point to the source distribution grounding point. The current return network also provides lightning protections as well as personal safety protection path. However, in composite aircraft where the chassis may be formed of an insulation material, the routing of wires from the generators, to the forward and aft equipment bays, to the remote power distribution units and the equipment loads they service, and back to the forward equipment bay via the current return network, creates a large wire loop. In a composite aircraft, this long wire loop may induce a large current during a lighting strike to the aircraft under certain conditions. To address this concern, the wire loop may be shielded but this large wire loop and its shielding would undesirably contribute a significant amount of weight in the aircraft.

Commercial aircraft may be manufactured in separate sections that are then connected together to assemble a complete aircraft. Various systems in the aircraft may have components that are distributed across multiple sections. Before the sections are finally assembled together, many of the components in a section are installed and tested to confirm that they were assembled correctly. Therefore, to test and verify a section, the portions of the systems that are not yet present in the build sequence have to be emulated. Once section installations have been tested, final assembly of the sections forming the aircraft can be performed that would make repairs to errors found after this stage more difficult to correct due to limited accessibility.

In today's aircraft, one of the reasons final assembly is such a time consuming process is because of the large number of primary and secondary power connections and the large number of data connections between adjacent sections. Aircraft could be built at a faster rate and orders for completed aircraft could be filled more quickly by functionally testing systems earlier in the build cycle, thus eliminating the need to emulate some equipment located in other parts of the aircraft, reducing the number of connections across section breaks, eliminating integration panels, and by minimizing the weight and complexity of aircraft wiring.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a distributed power and communications system for a vehicle is provided. Power and data elements interface with vehicle systems within the vehicle. Modular equipment centers (MECs) are spatially distributed throughout the vehicle such that one or more of the MECs is located in each of the vehicle sections. Each of the MECs provide electrical power and communication data for independently servicing equipment loads. Remote modular equipment centers (RMECs) are distributed throughout the vehicle. Each RMEC receives electrical power and communication data from the MEC closest in proximity. A zone of one or more of the power and data elements is serviced by the nearest RMEC. Each RMEC is configured to distribute electrical power to and collect data from the power and data elements of an associated zone.

According to another embodiment disclosed herein, a distributed power and communications system for an aircraft is provided. The system includes a line replaceable unit (LRU) housing an RMEC. The LRU receives secondary electrical power and communication data from a MEC to service the RMEC. The LRU is positioned in a zone of one or more power and data elements in proximity of the LRU and the RMEC is configured to distribute electrical power to the power elements and to collect data from the data elements of an associated zone.

According to yet another embodiment disclosed herein, a method for providing power and data to remote power and data elements of a vehicle is provided. The method includes distributing primary power to a plurality of MECs and distributing secondary power to a RMEC from at least one MEC. The RMEC is associated with one or more power and data elements in proximity of the RMEC and secondary electrical power is distributed to the one or more power and data elements associated with the RMEC.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIGS. 10A-10D illustrate various configurations for high voltage primary power busing structures of primary MECs relative a particular power input source and a plurality of different power outputs according to at least one embodiment disclosed herein.

DETAILED DESCRIPTION

Figure 1:
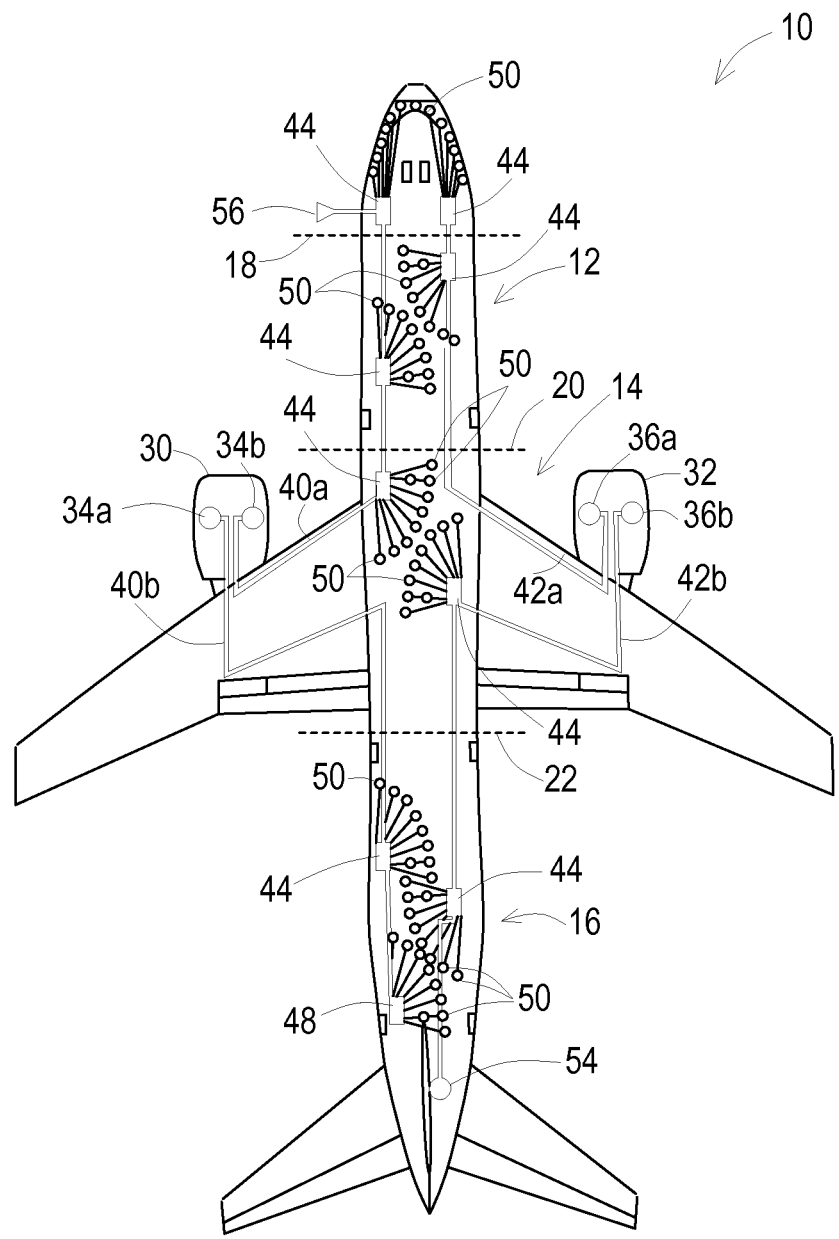
FIG. 1 illustrates a top view of one configuration of an aircraft with spatially distributed modular equipment centers (MECs) wherein equipment loads are serviced by the nearest MEC according to at least one embodiment disclosed herein.

The following detailed description is directed to vehicles having modular equipment centers to increase vehicle system redundancies while also distributing the modular equipment centers (MECs) throughout the vehicle in such a way that minimizes wire weight and the number of required wire connections to reduce overall vehicle weight and production time. The present invention is susceptible of embodiment in many different forms. There is no intent to limit the principles of the present invention to the particular disclosed embodiments. References hereinafter made to certain directions, such as, for example, "front", "rear", "left" and "right", are made as viewed from the rear of the vehicle looking forward. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

Aspects of this disclosure may be used in many types of vehicles such as, for example, aircraft, spacecraft, satellites, watercraft, submarines, and passenger, agricultural or construction vehicles. Aspects of this disclosure may also be used in different constructions of vehicles. While the immediate benefit is towards vehicles that have non-conducting frames, chassis or skin, the disclosure features may be suitable and beneficial of vehicles constructed of conductive materials. For the sake of simplicity in explaining aspects of the present disclosure, this specification will proceed utilizing a composite aircraft 10 as the primary example. However, as will be seen, many of aspects of the present disclosure are not limited to the composite aircraft 10.

As well understood by those skilled in the art, the exemplary aircraft 10 depicted in FIG. 1 includes a body commonly referred to as a fuselage that is made substantially of composite materials, or composites. The outer composite skin on the fuselage of the aircraft 10 conforms to the curvature of fuselage frames. The fuselage includes a plurality of vehicle sections such as a forward section 12, a middle section 14, and an aft section 16. Section breaks 18, 20, 22 are defined between adjacent aircraft sections. The composite aircraft 10 may have any number of engines. As shown in FIG. 1, left engine 30 is supported on the left wing and right engine 32 is supported on the right wing. Each of the engines 30, 32 has a rotor which defines a rotor burst zone 38 (FIG. 5A) in which damage to the fuselage and aircraft systems between the engines 30, 32 may occur as a result of an event or an operational inconsistency with one of the engines 30, 32.

The composite aircraft 10 may have any number of sections and the position of the aircraft sections or systems within the composite aircraft 10 may sometimes be described as being forward or aft of the rotor burst zone 38. Floor beams extend between fuselage frames to define a passenger compartment above the floor beams and a cargo area for holding cargo below the floor beams. Stanchions extending between the fuselage frames and the floor provide a fulcrum to assist in stiffening the floor of the composite aircraft 10. The passenger area is pressurized and all or part of the cargo area may be pressurized. Ducts may be positioned through the crown run of the composite aircraft 10 above the passenger compartment or below the floor in the cargo area such as between the fuselage frame and the stanchions.

On each of the engines 30, 32 are one or more main primary power sources such as high voltage AC left power generators 34a, 34b and high voltage AC right power generators 36a, 36b (hereinafter may be referred to collectively and/or generically as "left generators 34", "right generators 36" or "generators 34, 36"). Primary power feeders 40a and 40b extend from the left generators 34a, 34b and primary power feeders 42a and 42b extend from the right generator 36a, 36b. As shown in FIG. 1, primary power is distributed throughout the composite aircraft 10 via the primary power feeders 40a, 40b, 42a, 42b (hereinafter may be referred to collectively and/or generically as "power feeders 40, 42"). The composite aircraft 10 may also have one or more high voltage AC auxiliary power unit generators 54 for redundancy in the event one or more of the generators 34, 36 fail, as well as to provide power when the engines 30, 32 are not running. When the composite aircraft 10 is parked and the engines are not running, power may be provided to the aircraft by one or more power sources such as high voltage AC external power unit 56.

For purposes of this disclosure, low voltage and high voltage are those voltages typically referred to as either low or high voltage within the aircraft industry and as may be described in DO-160, Environmental Conditions and Test Procedures for Airborne Equipment, a standard for environmental test of avionics hardware published by RTCA, Incorporated. Throughout this disclosure, 230 VAC is referred to as high voltage but another voltage within a range of voltages, higher or lower than 230 VAC, could also be referred to as high voltage. Also, 28 VDC and 115 VDC are referred to as low voltages but another voltage within a range of voltages, higher or lower than either of 28 VDC and 115 VDC, could also be referred to as low voltage.

The composite aircraft 10 in FIG. 1 does not have dedicated centralized equipment bays for housing power and communications equipment. The equipment is configured into modular power and communication equipment centers, referred to as MECs, that are spatially distributed throughout the composite aircraft 10. For example, one or more MECs are spatially distributed in each of the forward, middle and aft sections 12, 14, 16. Each of the MECs provide localized power conversion and may be either a primary MEC 44, a secondary MEC 46, or an auxiliary or standby MEC 48, as described in greater detail below. Primary MEC 44, secondary MEC 46 and standby MEC 48 may generally be referred to as "MEC" with one or more applicable reference numbers 44, 46, 48. Primary power is distributed from the generators 34, 36 via power feeders 40, 42 across section breaks 18, 20, 22 to a primary power input of each of the MECs 44, 46, 48.

For optimized fault tolerance, the aircraft 10 may include a standby MEC 48 positioned in the rear of the aircraft 10 and at least two MECs 44, 46 positioned in each of the forward, middle, and aft sections 12, 14, 16 of the aircraft 10. For example, in FIG. 1 redundancy may be achieved by having multiple MECs 44, 46, 48 in each aircraft section without having to cross section breaks 18, 20, 22. Preferably, each section 12, 14, 16 includes a primary MEC 44 and a corresponding secondary MEC 46 thereby defining a two by three configuration of MECs 44, 46 plus a standby MEC 48. If there are four separate aircraft sections then there is a two by four configuration of MECs 44, 46. Preferably, the MECS 44, 46, 48 are alternately spaced on the left and right sides relative to one another along the length of the aircraft 10. It should be understood that the present disclosure is not limited to any particular number or configuration of MECs 44, 46, 48.

Figure 4:
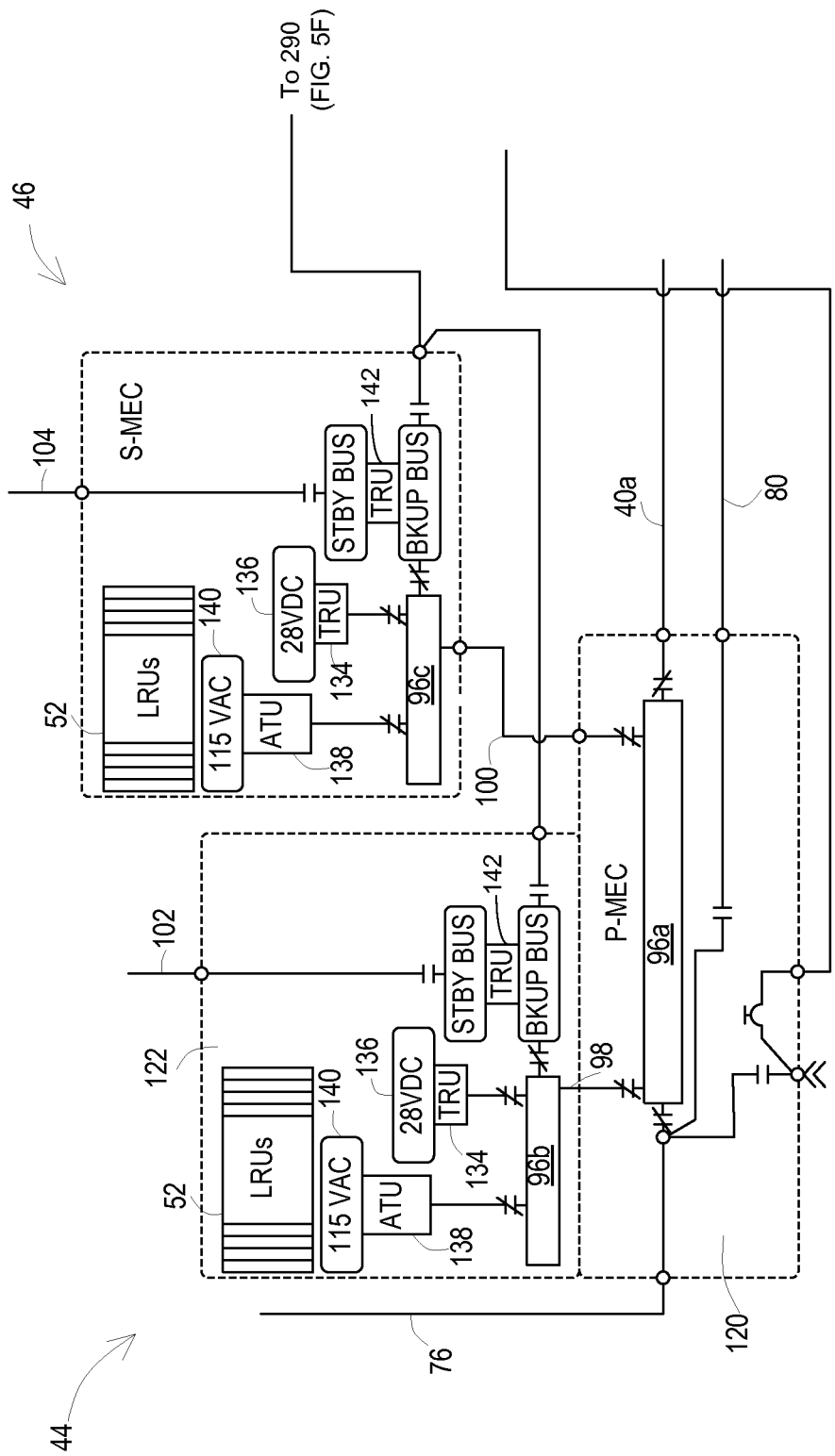
FIG. 4 illustrates one configuration of a primary MEC and a secondary MEC according to at least one embodiment disclosed herein.

Equipment loads 50 may be various electrical loads in an aircraft including, but not limited to, displays, fans, environmental units, and the like. Sometimes an equipment load 50 may be in the form of a line replaceable unit (LRU) 52 (FIG. 4). The equipment loads 50 within each of the aircraft sections 12, 14, 16 are grouped into one or more zones of power and communication. Each zone of equipment loads 50 across multiple systems may be associated with and serviced by the nearest MEC 44, 46. Preferably, each zone of equipment loads 50 is located within a single section and associated with at least one MEC location in the same zone. Preferably, the connecting wires or lines do not cross section breaks 18, 20, 22.

Generally, any equipment load 50 on the aircraft 10 requires both electrical power and communication data. Data is needed to tell the equipment load 50 what to do, or provide feedback about its current status, while electrical power is needed so the equipment load 50 can perform its intended function. If power and data are provided to an equipment load 50 from different equipment centers and if one of either the power or data is lost then the equipment load 50 then has an indeterminable state. To avoid indeterminate states each MEC 44, 46, 48 independently provides both the electrical power and communication data for servicing each of the localized equipment loads 50 within an associated zone. The electrical power and data communication to an equipment load 50 may be synced or grouped together in that both the power and the data communication provided to the equipment load 50 originate from a single source such as the nearest MEC 44, 46, 48. Synced electrical power and communication data is sometimes referred to as a power channel. Each of the equipment loads 50 within a zone may receive power from a particular MEC 44, 46 and therefore the network communication switches providing data to those same equipment loads 50 are powered by that same MEC 44, 46.

The MECs 44, 46, 48 are configured to distribute power received from the main power sources. The MECs 44, 46, 48 may independently convert the primary power into secondary power. Secondary power may be distributed from the MECs 44, 46, 48 to then independently service each of the equipment loads 50 within each zone without a secondary branch power network extending across the section breaks 18, 20, 22. In such case, control and conversion of the primary power may be distributed to each of the primary MECs 44 of each section of the aircraft 10 such that only primary power is distributed across the section breaks 18, 20, 22 amongst the primary MECs 44. Ina preferred configuration, only high voltage power feeders and the data backbone cross production breaks.

Distributing only primary power across section breaks 18, 20, 22 reduces the amount of wire required for distributing secondary power across multiple sections of the aircraft 10. This is because the distributed MEC architecture creates a separate secondary power distribution network within each section that allows for shorter runs of secondary wiring. Doing so reduces the overall weight of the wire utilized throughout the aircraft as well as the number of secondary connections required when joining adjacent fuselage sections. Also, because of the shorter secondary power runs, the total loop area of the power feeder run is reduced as compared to an implementation within a current return network. Moreover, aircraft production processes are improved because the secondary power network of wires extending across section breaks are limited or eliminated. The reduction of secondary power wires extending across section break are more readily tested and build quality verified earlier due to reduced reliance on other sections before final assembly of the aircraft 10.

As shown in FIG. 1, primary power feeder 40a extends from generator 34b on the left engine 30 into the middle section 14 to a MEC 44 shown on the left side of the mid section 14, across section break 20 to another MEC 44 shown on the left side of forward section 12, and then to another MEC 44 shown on the left side in front of forward section 12. Primary power feeder 40b extends from generator 34a on the left engine 30 into the middle section 14 to a MEC 44 on the left, across section break 22 to a left aft MEC 44, and then to a left aft MEC 48. Power feeder 42a extends from generator 36a on the right engine 32 into the middle section 14, across section break 20 to a MEC 44 on the right in forward section 12, and then to another MEC 44 on the right in front of the forward section 12. Primary power feeder 42b extends from generator 36b on the right engine 32 into the middle section 14 to middle right MEC 44, across section break 22 to right aft MEC 44, and then to right aft MEC 44. Alternatively, the power feeders 40a, 40b could instead provide primary power to the MECs 44 on the right side of one or more sections of the aircraft 10. In such case, the power feeders 42a, 42b would provide primary power to the MECs 44 on the left side of one or more sections the aircraft 10.

Also, one of the generators 34a, 34b on the left engine 30 could provide primary power to one side of the aircraft forward of a rotor burst zone 38 and the other of generators 34a, 34b on the left engine 30 could provide primary power to the other side of the aircraft 10 aft of the rotor burst zone 38. In such case, one of the generators 36a, 36b on the right engine 32 could provide primary power forward of the rotor burst zone 38 to the opposite side that is powered by one of the left generators 34a, 36b. The other of generators 36a, 36b on the right engine 32 could provide primary power aft of the rotor burst zone 38 to the opposite side powered by the other one of the left generators 34a, 36b.

Figure 2:
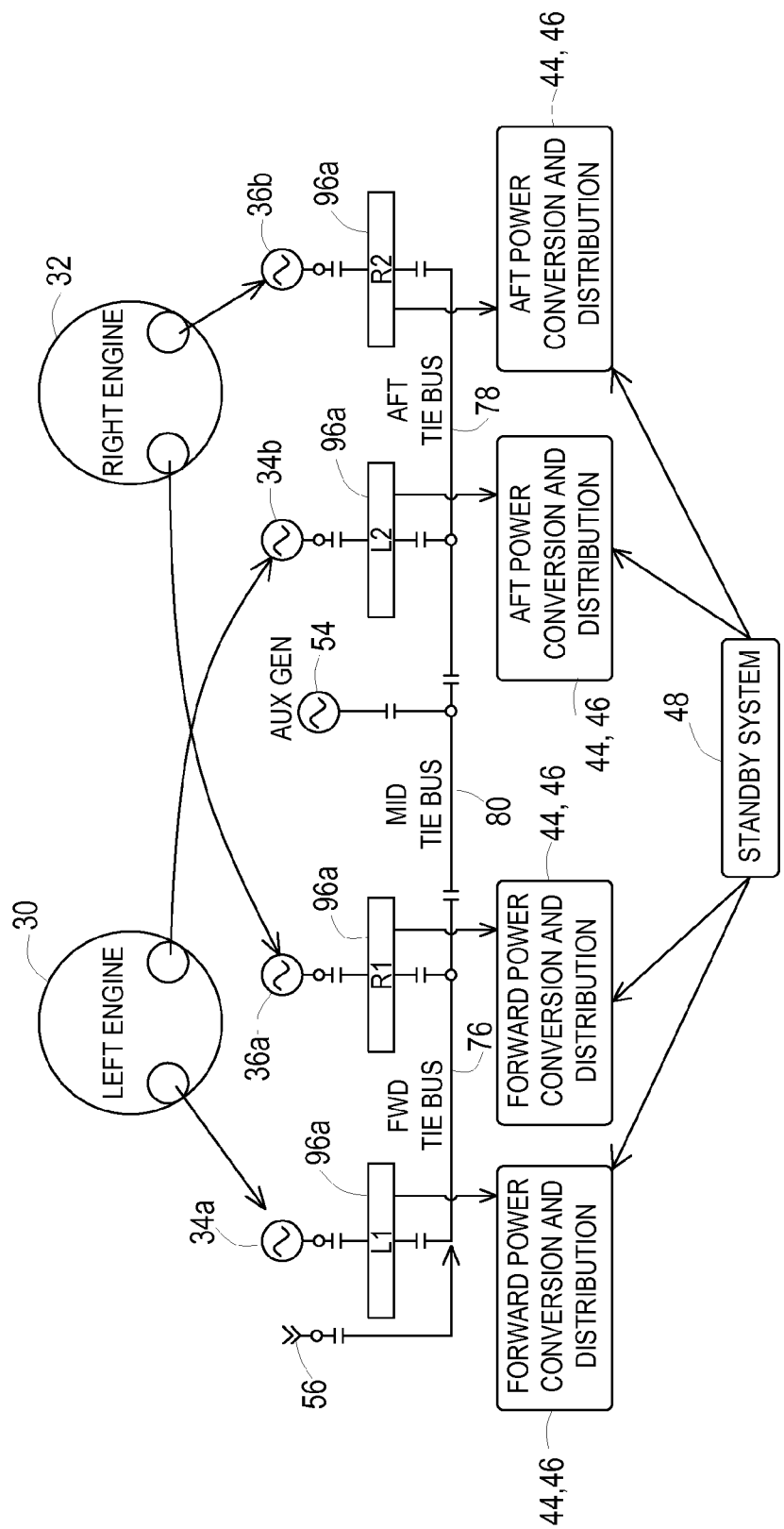
FIG. 2 illustrates the splitting of two generators per aircraft engine relative forward and aft of the aircraft according to at least one embodiment disclosed herein.

FIG. 2 illustrates splitting two generators per engine relative the rotor burst zone 38 of the aircraft 10 which increases the availability of primary power in the event of an operational issue with an engine 30, 32. If one of the engines 30, 32 is lost, or a generator 34, 36 within one of the engines 30, 32 fail, the two remaining generators 34a, 34b, 36a, 36b on the remaining engine 30, 32 distribute both forward and aft primary power to the aircraft 10. Generator 34a of the left engine 30 and generator 36a of the right engine 32 power a pair of primary power switching buses 96a forward of the rotor burst zone 38 that are connected to one another by a forward tie bus 76. Generator 34b of the left engine 30 and generator 36b of the right engine 32 power another pair of primary power switching buses 96a aft of the rotor burst zone 38 that are connected by an aft tie bus 78. A mid tie bus 80 connects at least one of the forward primary power switching buses 96a with at least one of the aft primary power switching buses 96a. Therefore, when an engine 30, 32 experiences an operational inconsistency, the aircraft 10 continues to have power and control on one side along the entire length of the aircraft 10 due to the distribution of power from the remaining engine 30, 32 in a forward and aft manner. The power and control is distributed from a single engine 30, 32 both forward and aft of the rotor burst zone 38 without increasing the amount of wiring. FIG. 2 also illustrates the primary power switching buses 96a distributing power to the secondary MECs 46 for power conversion and distribution to equipment loads 50 as explained in greater detail below. A standby MEC 48 may be coupled to the secondary MECs 46 to provide backup power when the primary main AC power sources are not available to the primary power switching buses 96a as explained in greater detail below.

Figure 3:
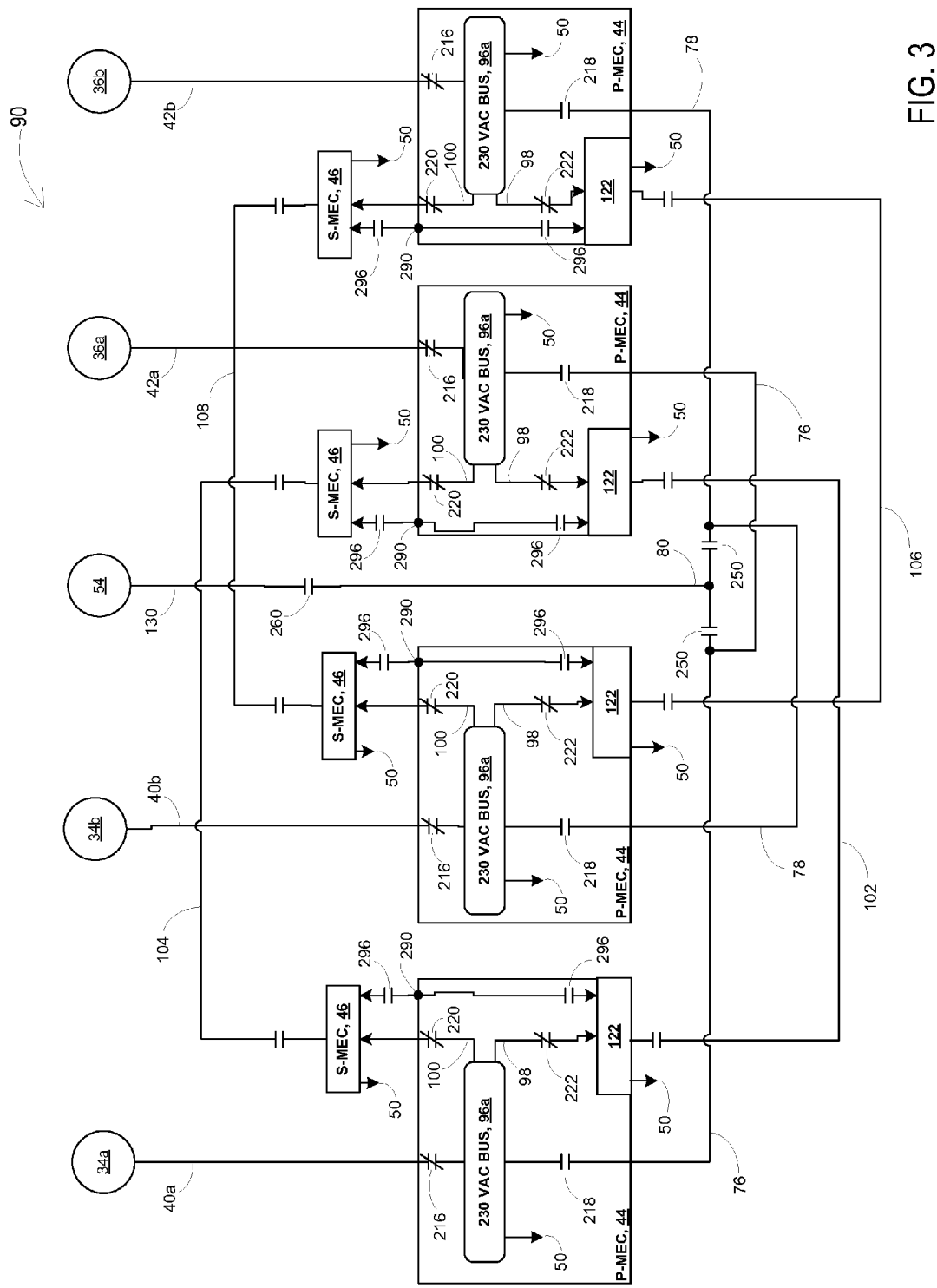
FIG. 3 illustrates one configuration of primary power feeders connected to generators energizing a power bus network according to at least one embodiment disclosed herein.

Unserviced equipment loads 50 in one or more zones occurs primarily for two reasons. Either all of the generators 34, 36 failed and therefore primary power is no longer available to any of the MECS 44, 46 or one or more of the buses 96 are physically damaged due to an event such as a rotor or tire burst. Rerouting of high voltage power from either of the four generators 34, 36 or auxiliary power unit generator 54 based on failure of one or more main primary power sources occurs at the primary bus level via the tie buses 76, 78, 80 through opening and closing of combinations of switches as shown by the primary power busing network system 90 depicted in FIG. 3. In one or more embodiments, one or more standalone solid state switches, for example contactors, are included on the primary power switch network system 90. The solid state switches each have a self-contained control function configured to provide one or more of localized protections, voltage sensing, and current sensing, independent of the availability of other power system components. The standalone solid state switch can function without the need for data from other power system components. Opening and closing of the solid state switch interrupts and routes primary power across one or more of the primary power switching buses to one or more of the MECs 44, 46, 48. Beginning with FIG. 3, specific contactors are depicted as either primarily closed or primarily open. The symbol for an open contactor is two parallel lines. The symbol for a normally closed contactor is the same with the exception that a diagonal line is drawn through the parallel lines. The standalone solid state switch may also include pulse width modulation to limit current flow through the standalone solid state switch. Rerouting of secondary power and low voltage DC between the MECs 44, 46, 48 based on failure of high voltage buses and conversion occur by the opening and closing of combinations of switches as shown by the primary power busing network 90 as depicted in FIG. 3.

Each MEC 44, 46, 48 has both primary and secondary power and is capable of independently performing closed loop processing and local control of sensors without being dependent on a central computer system. The distributed power system control architecture permits sharing of the overall vehicle power distribution status among the MECs 44, 46, 48 but each MEC 44, 46, 48 is only responsible for servicing equipment loads 50 in proximity of each MEC, with the exception of MEC 48 which also distributes standby power to all other MECs 44, 46. Each MEC 44, 46, 48 manages data associated with the zone of the nearest equipment loads 50 such that each MEC 44, 46, 48 independently performs operations within its own zone of equipment loads 50.

Each MEC 44, 46, 48 also preferably has solid state switching for bus power control and also provides circuit protections. In FIG. 3 power from primary power feeders 40, 42 connected to the generators 34, 36 energizes primary power switching buses 96a. Each primary power switching bus 96a branches off to a primary power switching bus 96b within MEC 44 and a primary power switching bus 96c within MEC 46. Each primary power switching bus 96a connected with distribution feed 98 to a primary power switching bus 96b corresponds with a single primary MEC 44 as shown in FIG. 4 and as described in greater detail below.

Figure 12A:
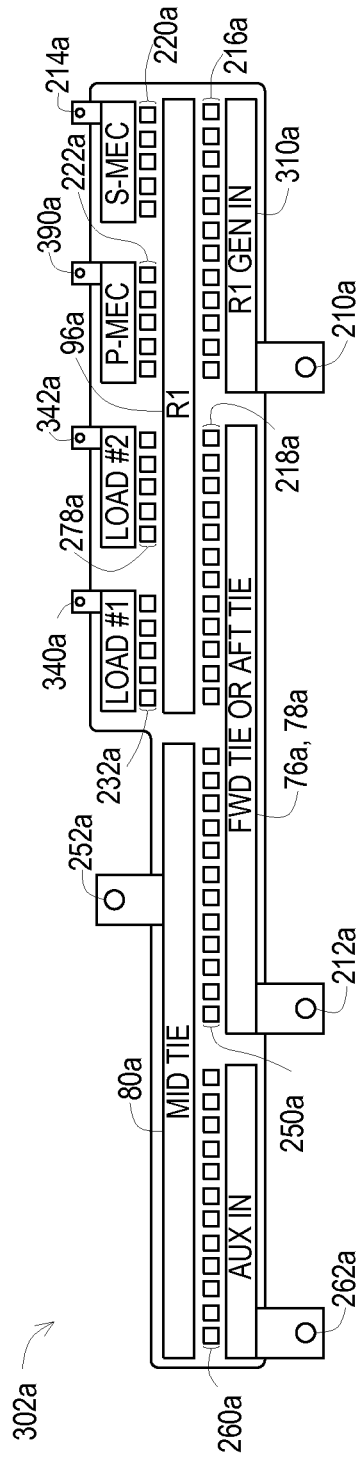
FIGS. 12A-C illustrate one configuration of a set of primary power switching network devices for use with a primary MEC receiving three-phase power from a generator according to at least one embodiment disclosed herein.
Figure 12B:
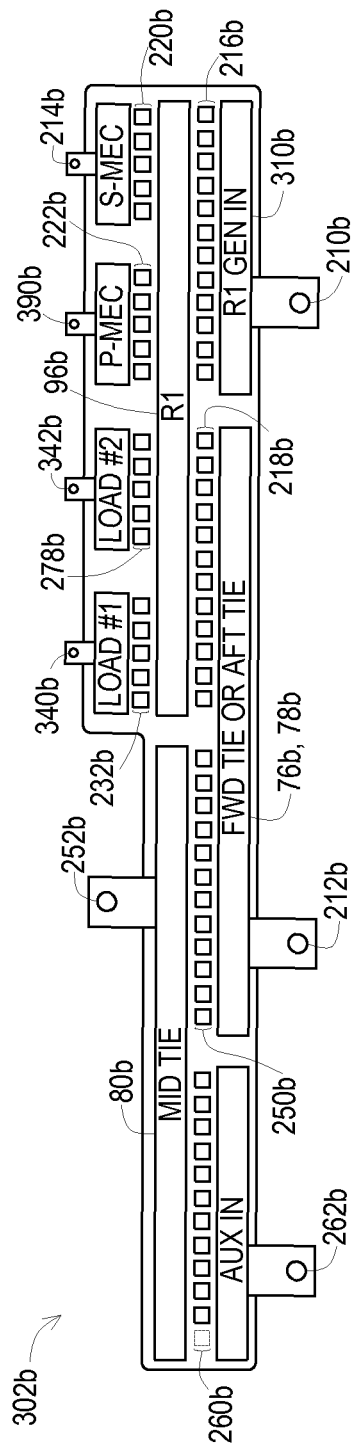
Figure 12C:
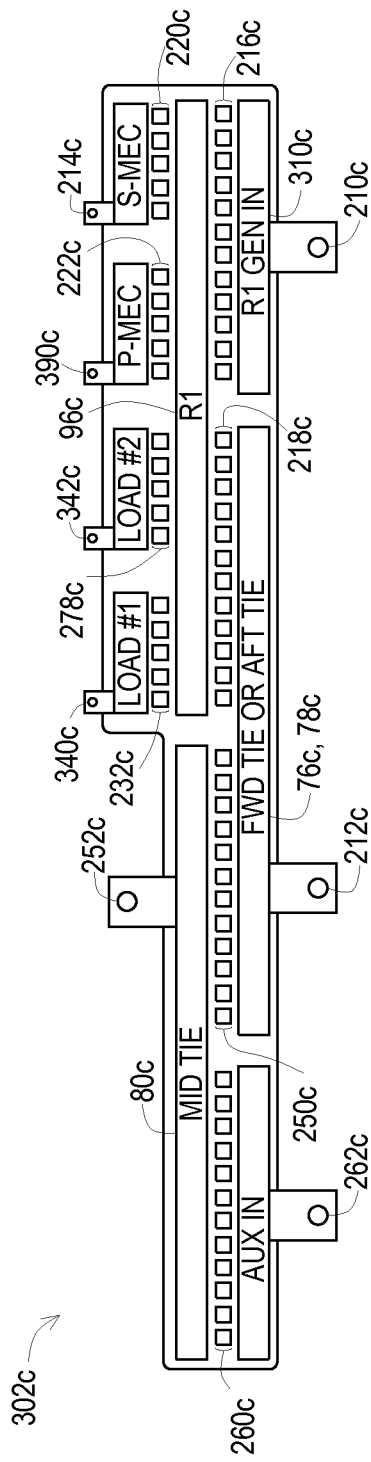

Referring to FIG. 4, a portion of each primary MEC 44 with a primary power switching bus 96a is a high power portion 120 and another portion of the primary MEC 44 with the primary power switching bus 96b is a low power portion 122 of the primary MEC 44. The high power portion 120 of a primary MEC 44 is configured to receive primary power from any high power main source available to the aircraft 10 and is sometimes referred to as a primary power switching network device 302 (FIG. 12A-12C). The network of high power portions 120 of the primary MECs 44 within the aircraft 10 define a high voltage primary power switching network.

The low power portion 122 is preferably configured to handle a fraction of the power from onboard power sources but still be able to handle the same voltages as the high power portions 120. The primary power switching buses 96c correspond with secondary MECs 46 shown in FIG. 4. FIG. 4 best illustrates the similarity between a secondary MEC 46 and the low power portion 122 of a primary MEC 44. Primary MECs 44 include the primary level power network busing structure of primary power switching buses 96a to reroute primary power sources across the aircraft 10 that secondary MECs 46 do not have. During normal as well as abnormal operations, the primary and secondary MECs 44, 46 both have primary and standby power. Secondary MECs 46 service the nearest equipment loads 50 just like a primary MEC 44.

Referring back to FIG. 3, distribution feeds 98 extend between primary power switching buses 96a and 96b of each primary MEC 44 and distribution feeds 100 extend between each bus 96b of the primary MEC 44 and the primary power switching bus 96c of a secondary MEC 46 that directly receives power from the same source. Also, a crosstie 102 extends between the bus primary power switching 96b of the primary MEC 44 associated with left generator 34a and the primary power switching bus 96b of the primary MEC 44 associated with the right generator 36a. A crosstie 104 extends between the primary power switching bus 96c of the secondary MEC 46 associated with left generator 34a and the primary power switching bus 96c of the secondary MEC 48 associated with the right generator 36a. A crosstie 106 extends between the primary power switching bus 96b of the primary MEC 44 associated with left generator 34b and the primary power switching bus 96b of the primary MEC 44 associated with the right generator 36b. A crosstie 108 extends between the primary power switching bus 96b of the secondary MEC 46 associated with generator 34b and the primary power switching bus 96b of the secondary MEC 46 associated with the right generator 36b. Auxiliary power unit generator 54 is connected to the crossties 102, 106, respectively.

Figure 5A:
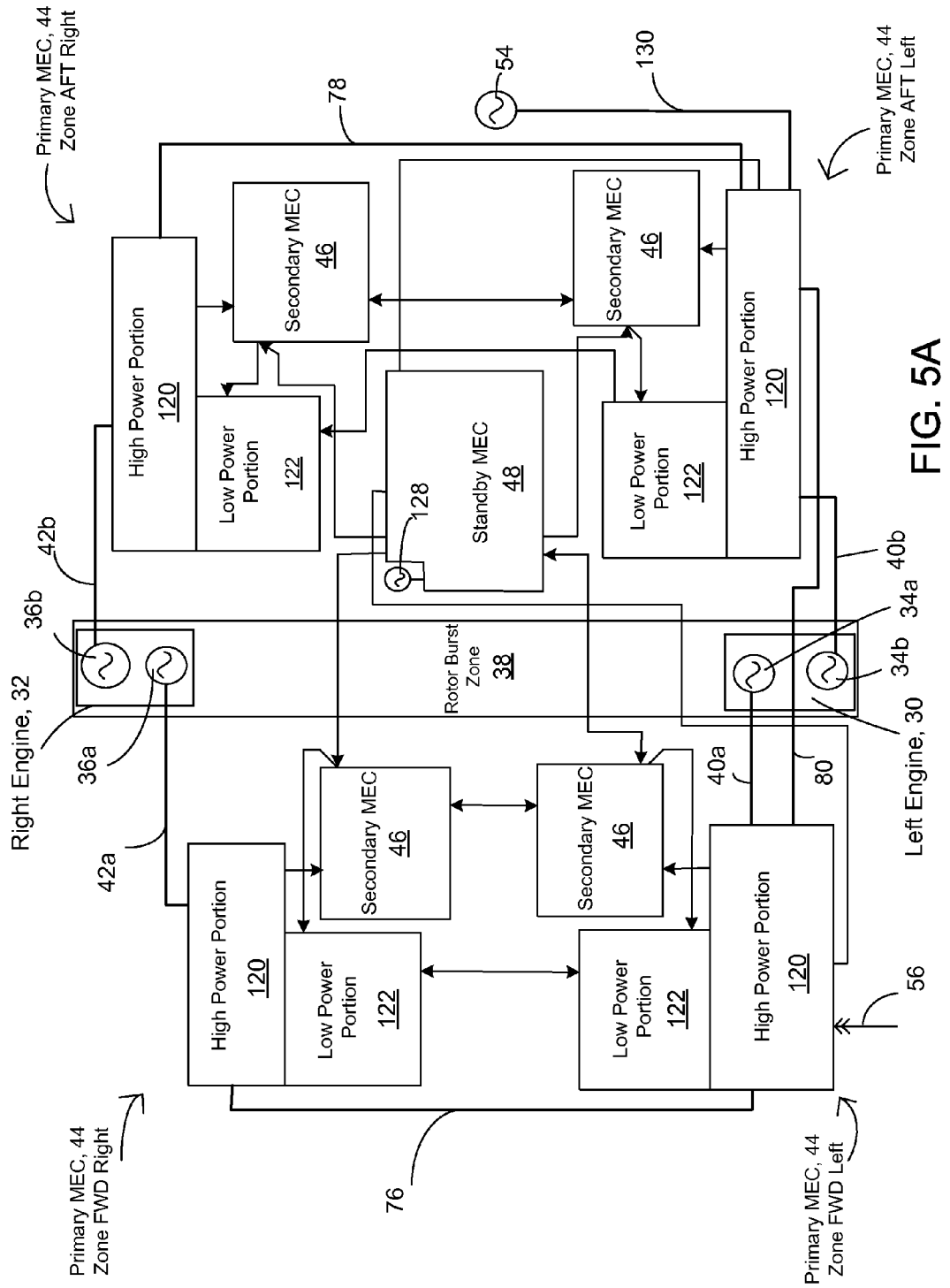
FIGS. 5A-5F illustrate one configuration of a fault tolerant combined primary and secondary power distribution network of primary MECs, secondary MECS, and a standby MEC according to at least one embodiment disclosed herein.
Figure 5B:
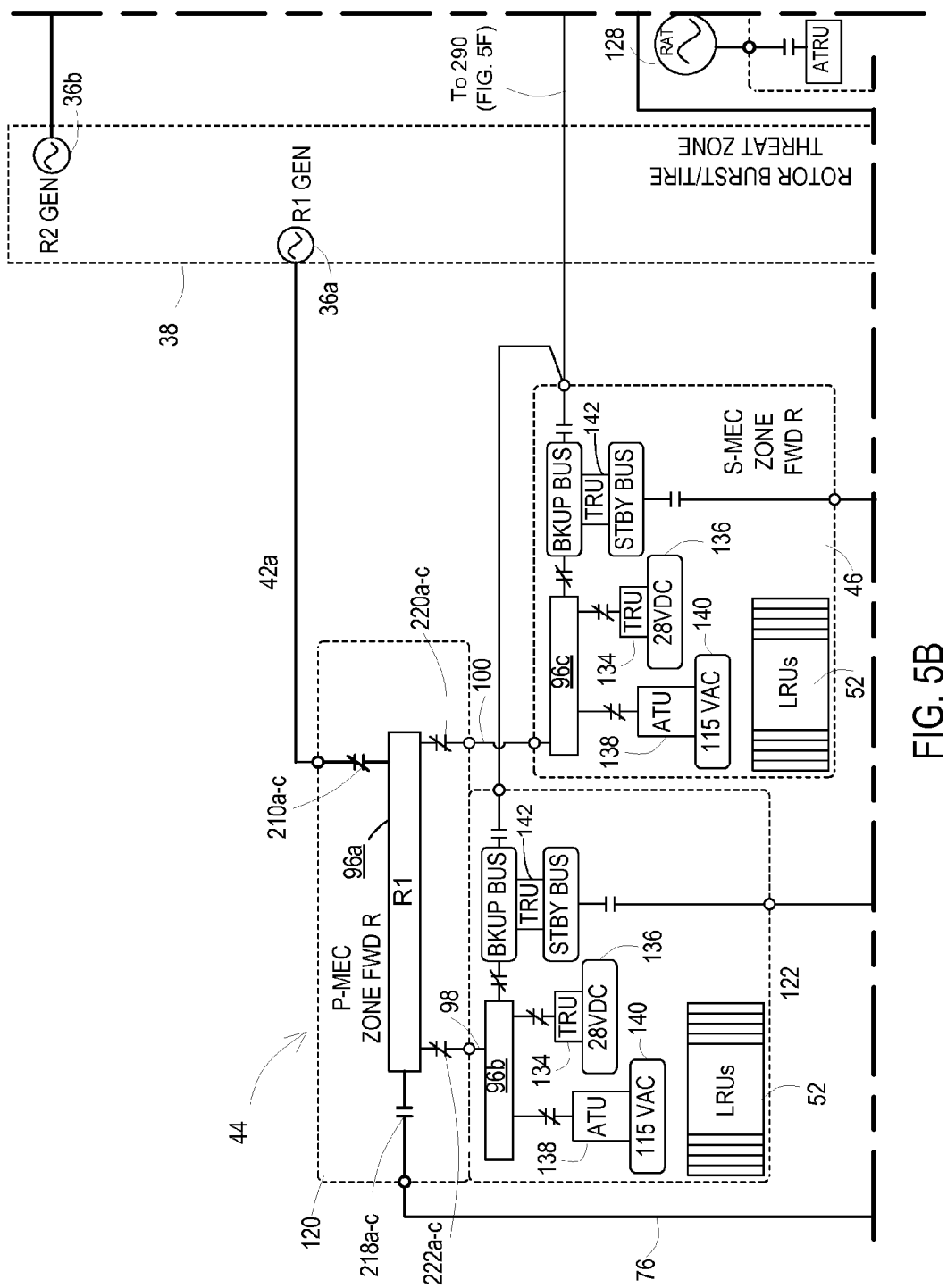
Figure 5C:
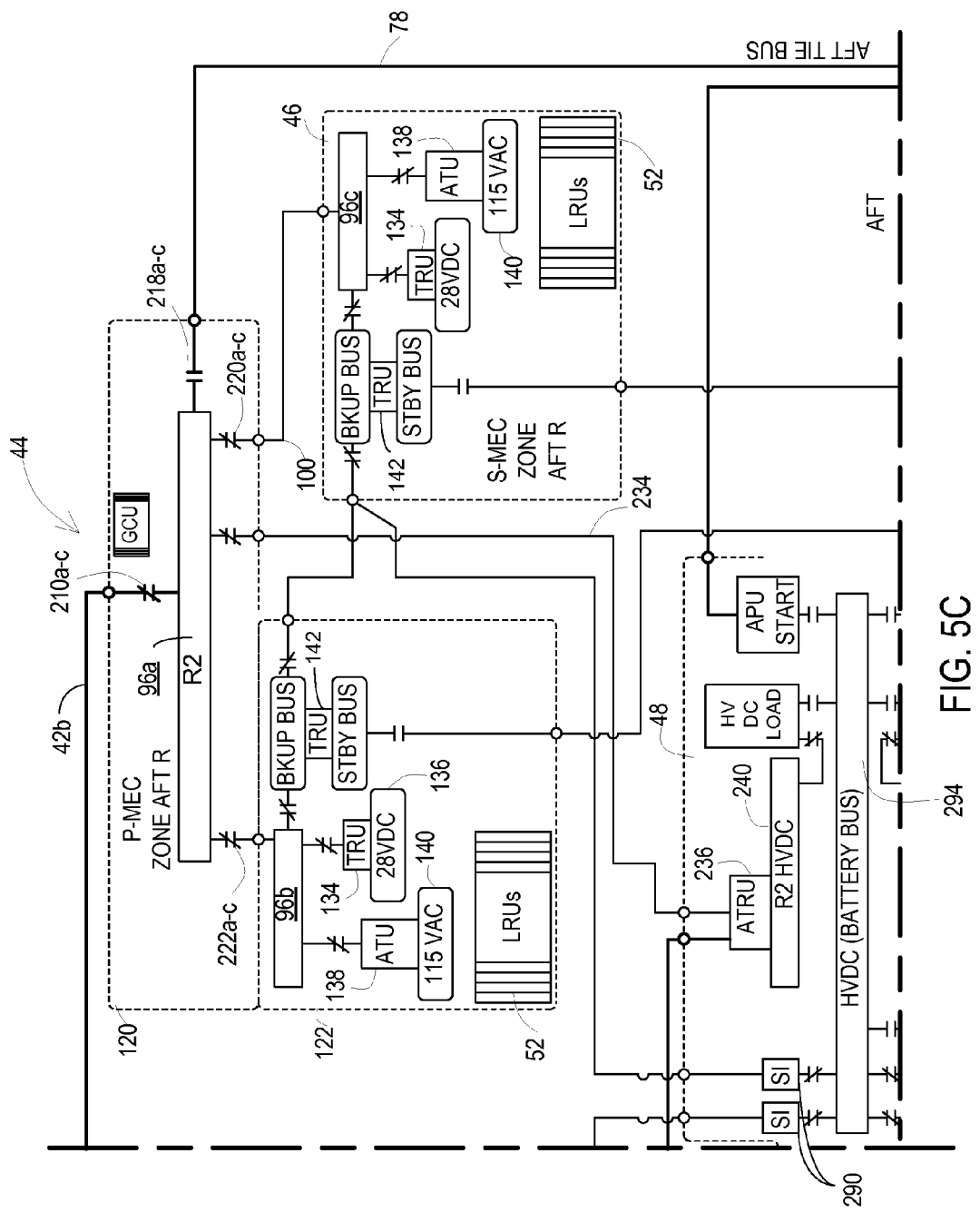
Figure 5D:
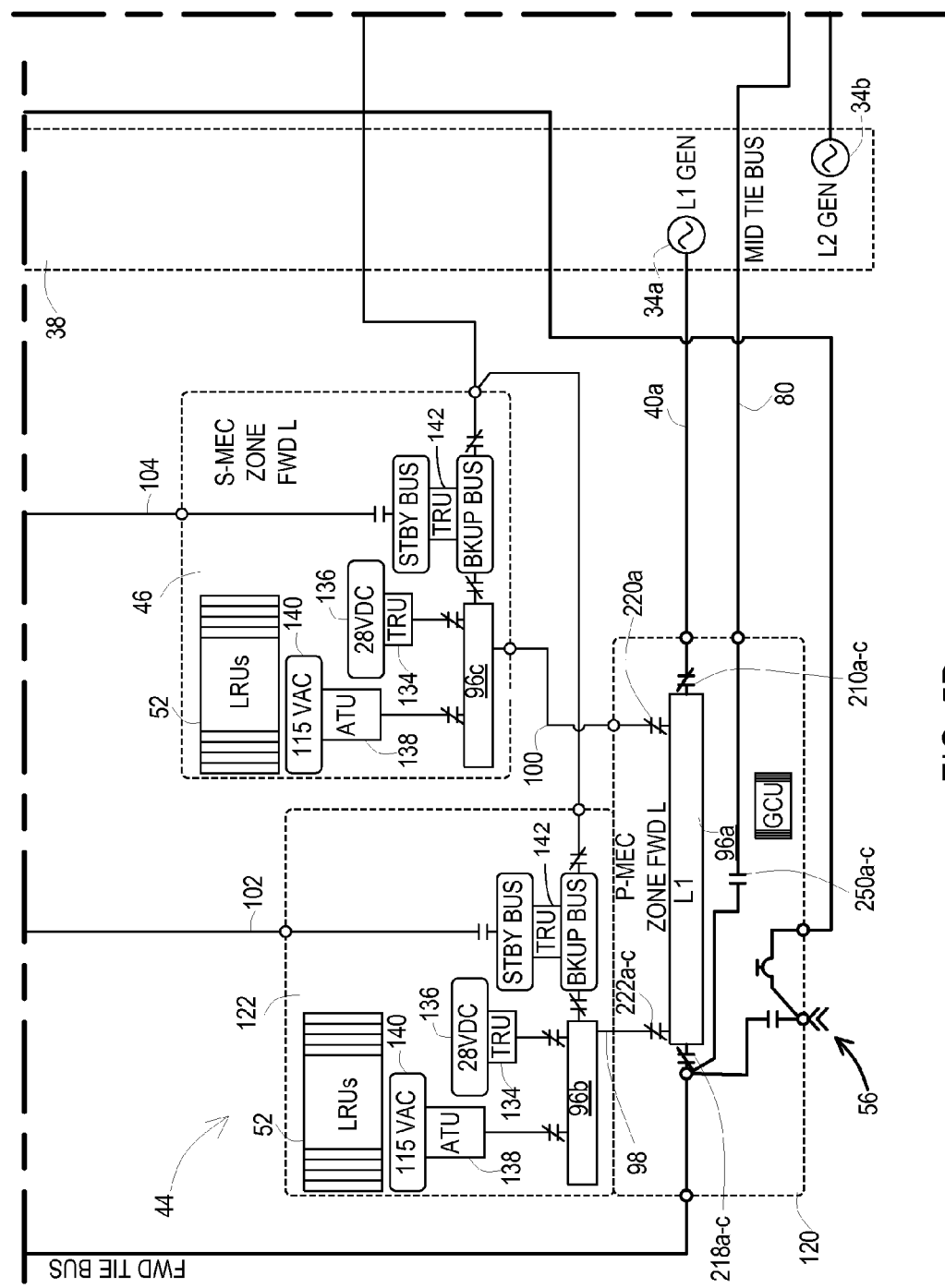
Figure 5E:
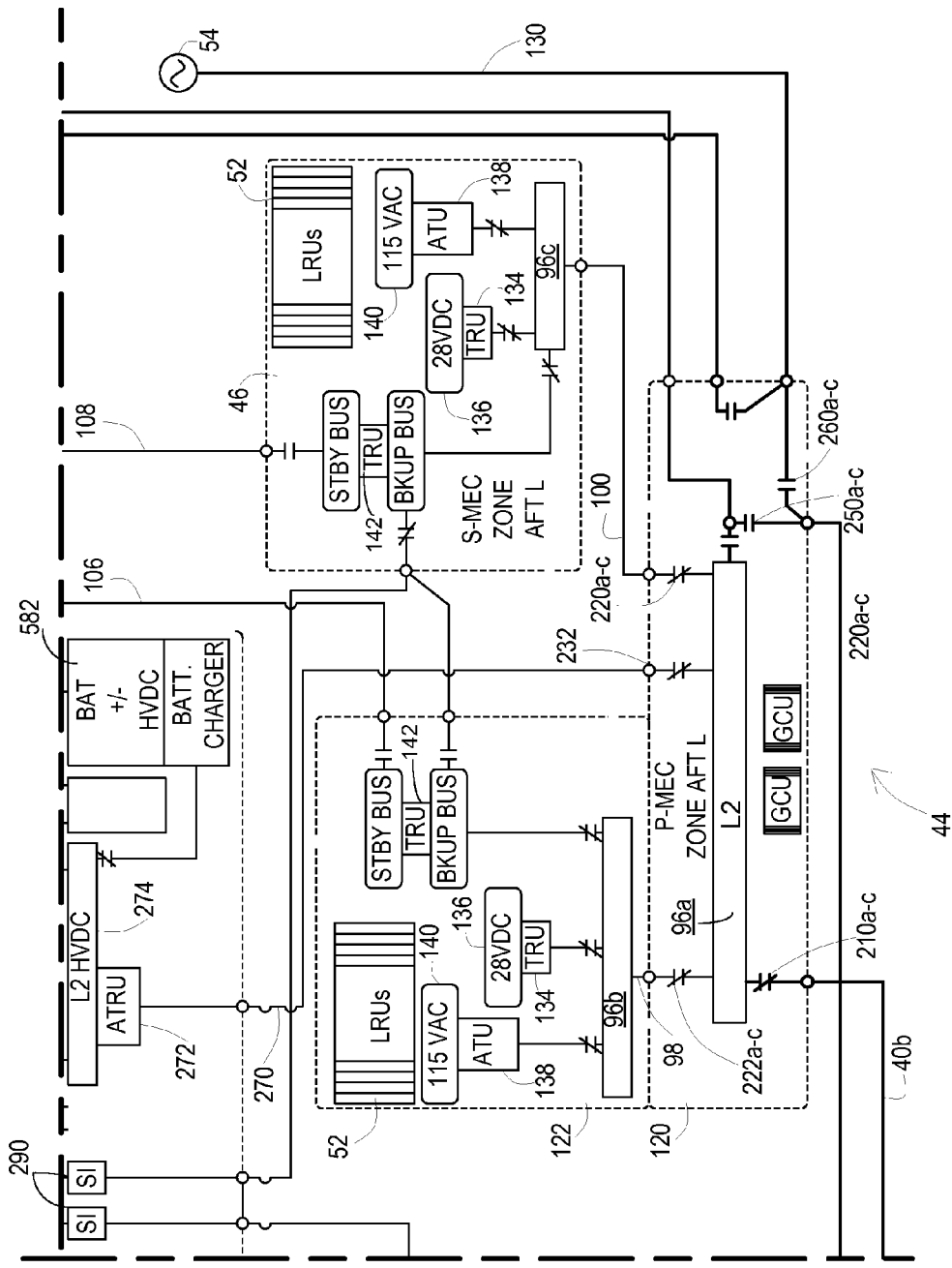
Figure 5F:
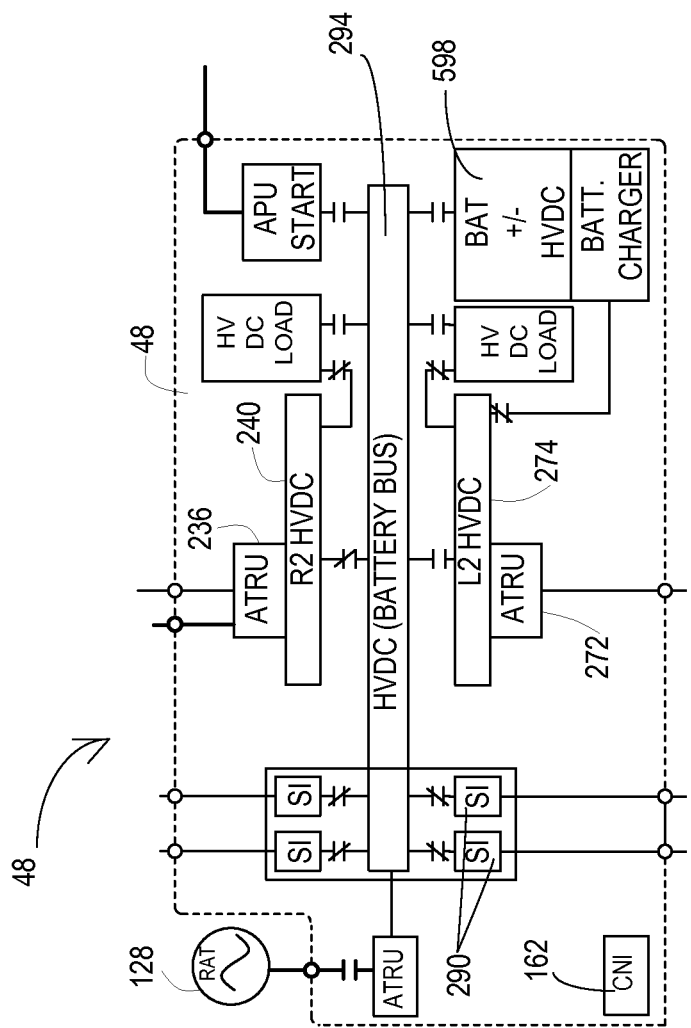

FIG. 5A illustrates one configuration of the fault tolerant combined primary and secondary power distribution networks of primary, secondary and standby MECS 44, 46, 48 within the aircraft 10. For purposes of illustrating greater detail, FIGS. 5B-5E illustrate close-up partial views of four separate portions which can be positioned next to each other to assemble the complete system depicted in FIG. 5A. Two dot-dash lines on each of FIGS. 5B-5E denote the broken edges of each partial view. FIG. 5B illustrates the top left portion of FIG. 5A. FIG. 5C illustrates the top right portion of FIG. 5A. FIG. 5D illustrates the bottom left portion of FIG. 5A and FIG. 5E illustrates the bottom right portion of FIG. 5A. Also, FIG. 5F illustrates one configuration of the standby MEC 48 of the system of FIG. 5A. The contactors shown in FIG. 3 are also shown symbolically in FIGS. 5A-5F, but without reference numbers to simply 5A-5F, and may also be shown in other drawings without any reference numbers or having different reference numbers.

In FIG. 5A the primary and secondary MECS 44, 46 are arranged in such a way that there are a total of four in the forward sections of the aircraft 10 and another four in the aft sections of the aircraft 10. Preferably, there is a primary MEC 44 and a secondary MEC 46 in each of a pair of forward sections and a primary MEC 44 and a secondary MEC 46 in each of a pair of aft sections. FIG. 5A also shows a standby MEC 48 in an aft section of the aircraft 10. The non-time limited power source for the standby MEC 48 can be a RAM air turbine (RAT) 128 or other suitable independent time limited standby power source such as a battery or fuel cell. In the event of an operational inconsistency with all the generators 34, 36, the RAT 128 is deployed to provide standby power to standby MEC 48 as well as to one or more of the MECs 44, 46 in the event that all of the generators 34a, 34b, 36a, 36b have an operational inconsistency. The battery 598 provides temporary operational power to standby MEC 48 as well as to one or more of the MECs 44, 46 while the non-time limited RAT 128 is being deployed.

If one of the generators 34a, 34b, 36a, 36b fails, power is not being received at the primary power switching bus 96a of a primary MEC 46. Therefore, the equipment loads 50 off of the lower power portion 122 of the primary power switching bus 96b of the unpowered primary MEC 44 are unserviced and the equipment loads 50 off of the primary power switching bus 96c of an unpowered adjacent secondary MEC 46 are unserviced. Power is then rerouted at the primary level from one of the other remaining operational sources by opening and closing of combinations of contactors to energize primary power switching bus 96a of unpowered primary MEC 44 to power its equipment loads 50 and to energize primary power switching bus 96c of any unpowered adjacent secondary MEC 46 to power its equipment loads 50.

Alternatively, if a MEC 44, 46, 48 experiences a physical failure and as result its equipment loads 50 are unpowered, then power may be rerouted to power the equipment loads 50 of the unpowered MEC 44, 46, 48 by another powered MEC 44, 46, 48. Depending on the amount of power available to be rerouted, all or only a portion of the equipment loads 50, such as only the critical loads, may be repowered. Also, if all power sources are lost and the MECs 44, 46, 48 are unpowered, then the standby MEC 48 with the fuel cell or RAT 128 can power the critical equipment loads 50 of the other MECs 44, 46. Critical loads are those equipment loads 50 that the aircraft 10 must have powered to maintain continued safe flight and landing. Essential loads are those equipment loads 50 that are desirable to have such as radios and other communications equipment but operation is not required to fly the aircraft 10. Non-essential loads are the lowest priority equipment loads 50 such as passenger comfort loads including food preparation devices, decorative lighting and cabin entertainment systems.

By way of example, the auxiliary power unit generator 54 could service the equipment loads 50 lost due to the failure of one of the main generators 34, 36. If generator 34b fails then, through a combination of contactors in forward tie bus 76, aft tie bus 78, mid tie bus 80, primary power is provided directly from the remaining main generators 34, 36. Alternatively, primary power may be provided from the auxiliary power unit generator 54 through another operational MEC 44, 46 across one or more of the crossties 102, 104, 106, 108, to the primary power switching bus 96a of an unpowered primary MEC 44 or to the primary power switching bus 96c of an unpowered secondary MEC 46.

In the event one or more of the MECs 44, 46 has a physical operational inconsistency, all or part of the plurality equipment loads 50 within the zone associated with each operationally inconsistent MEC 44, 46 can be associated with one or more other MECs 44, 46 that are nearest in proximity. For example, if a primary MEC 44 physically fails, the equipment loads 50 once serviced by that failed MEC 44 may be serviced by another MEC 44, 46 or a combination of MECs 44, 46. MECs 44, 46 can determine the types of equipment loads 50 once serviced by the failed MEC 44 and then determine whether one or more of the combination of MECs 44, 46 should service those unpowered equipment loads 50. If it is determined that a secondary MEC 46 in closest proximity to the failed primary MEC 44 is to service the additional equipment loads 50 then the zone originally associated with that secondary MEC 46 is expanded to encompasses the zone formerly serviced by failed primary MEC 44.

Alternatively, the additional equipment loads 50 may be divided between a secondary MEC 46 and another primary MEC 44 in proximity to the failed primary MEC 46. In such case, the zone of equipment loads 50 associated with the nearest operational primary MEC 44 is expanded to include a portion of the zone formerly serviced by failed primary MEC 44 and the zone of equipment loads 50 associated with the nearest operational secondary MEC 46 is expanded to include the remaining portion of the zone formerly serviced by failed primary MEC 44. In either case, one or more other MECs 44, 46 in proximity of a failed MEC 44, 46 are sourced to independently provide the services to the equipment loads 50 previously serviced by the failed MEC 44, 46.

Each secondary MEC 46 and each low power portion 122 of each primary MEC 44 includes contactors coupled to conversion equipment. The conversion equipment includes a transformer rectifier unit (TRU) 134, which rectifies the 230 VAC and converts it to the main DC output such as 28 VDC for bus 136, and an autotransformer or autostep down transformer unit (ATU) 138 to convert 230 VAC to 115 VAC for a low power AC output bus 140. Each secondary MEC 44 and low power portion 122 of a primary MEC 44 further includes a second TRU 142, not just for redundancy, but to provide power only to the critical loads absolutely necessary for continued safe flight and landing. Limiting the second TRU 142 to only critical loads ensures that the standby power sources are not overloaded.

Figure 6:
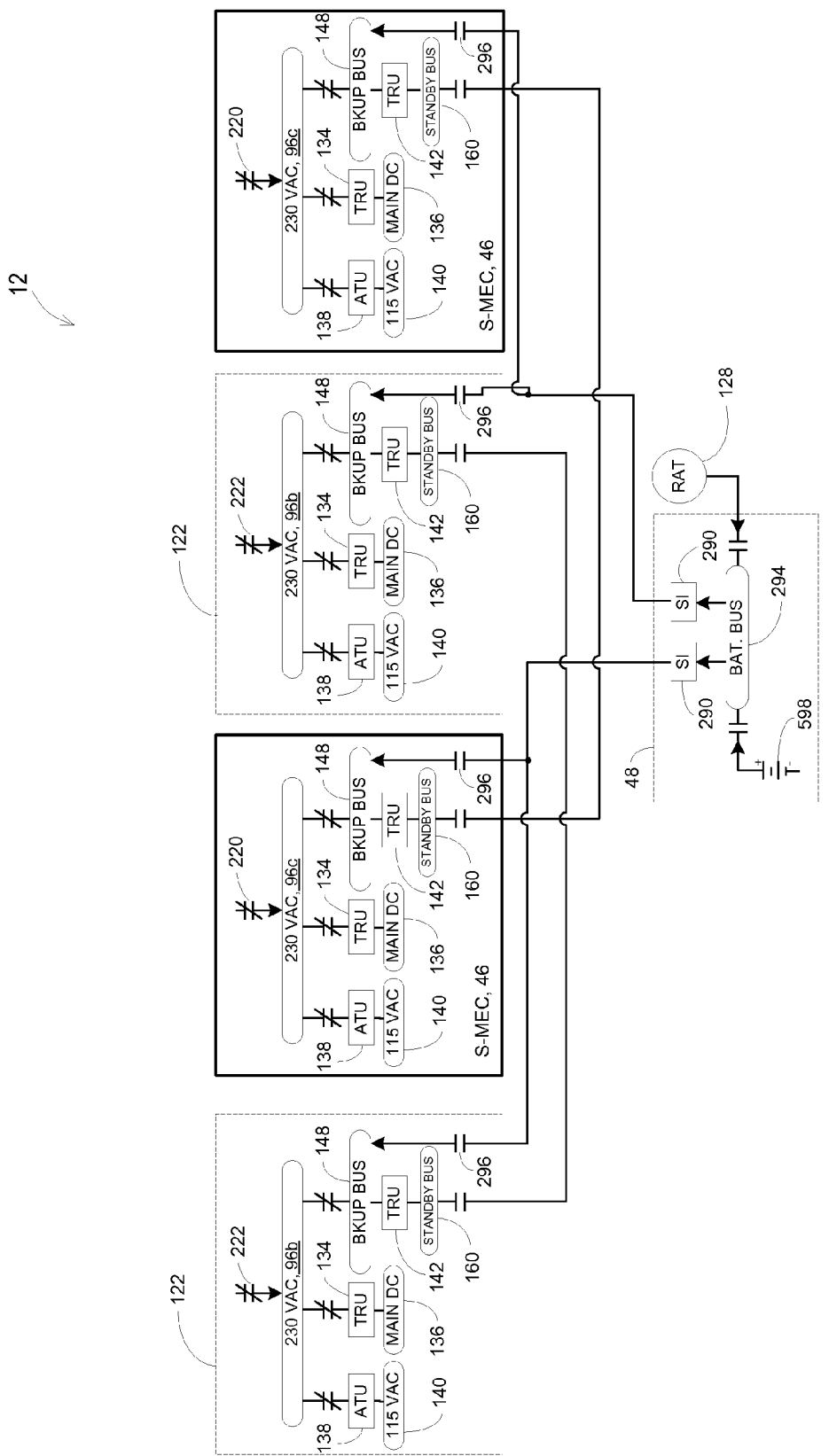
FIG. 6 illustrates one configuration of a secondary power busing network in a forward section of the aircraft according to at least one embodiment disclosed herein.

FIG. 6 illustrates the configuration of a secondary power busing configuration, in forward section 12 for example, where the primary power switching buses 96b in the low power portions 122 of the primary MECs 44 and the primary power switching buses 96c of the secondary MECs 46 are tied together. As described above, whether all or only a portion of the unpowered equipment loads 50 of a damaged MEC 44, 46 are serviced by another MEC 44, 46 depends on available power. In the event one of the TRUs 134 in one of the MECs 44, 46 within an aircraft section fails, the most critical of equipment loads 50 from the operationally inconsistent TRU 134 may be serviced by another MEC 44, 46 in that same aircraft section providing secondary power across the various contactors and backup buses 148.

Preferably MECs 44, 46 in the aft section 16, have secondary power tie-ins from the auxiliary power unit generator 54 due to their proximity to one another which minimizes the power feeder wire weight. Also, the MECs 44, 46 in the forward section 12 of the aircraft 10 tie in at lower voltage levels such as 115 VAC from the external power ground service equipment such as external power unit 56 as shown in FIGS. 2 and 6. However, the 115 VAC from the ground to the low power AC output buses 140 in the MECs 48 in the forward section 12 could be converted to higher voltages such as 230 VAC by bi-directional ATUs 138 which then may be distributed to the other MECs 44, 46 in other sections of the aircraft 10. Also, a second TRU 142, typically used for more critical loads as explained above, allows battery power from battery bus 294 via backup bus 148 to power those critical loads that were lost.

Figure 7:
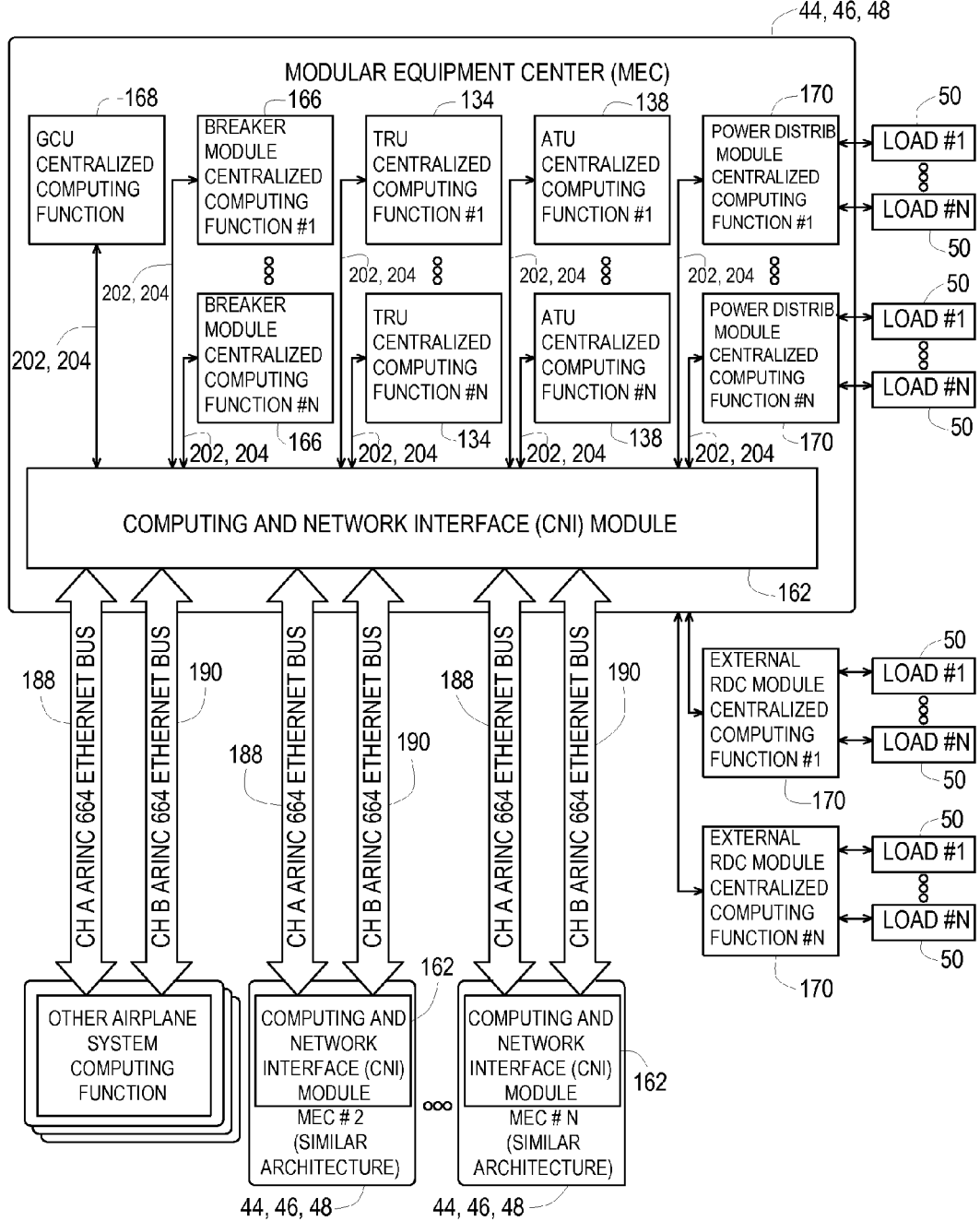
FIG. 7 illustrates one configuration of a MEC for servicing equipment loads and having a computing and network interface module for distributed computing functions and gateway routing of bi-directional data between MECs according to at least one embodiment disclosed herein.

As shown in FIG. 7, a computing (software and hardware) and network interface (CNI) module 162 located inside each MEC 44, 46, 48 provides distribute computing functions and gateway routing of bi-directional data. Each CNI module 162 contains two failsafe computing systems that become a fault tolerant computing system. Each fail safe computing system is redundant to the other. This fault tolerant computing system responds gracefully to unexpected hardware and/or software failures to allow no loss of service to system functions within the aircraft 10. The CNI module 162 transmits/receives data to/from internal MEC computing functions and external MEC computing functions via an internal system communication bus (such as FlexRay, Controller Area Network (CAN), ARINC 664, TTP or other bus technology). Other MECS 44, 46, 48 on the aircraft 10 will communicate with the CNI module 162 via a data networking specification, such as the ARINC 664, across external data communication channel A and external data communication channel B as shown in FIG. 7 having reference numbers 188 and 190, respectively.

The CNI module 162 is a distributed computing element that hosts specific software applications used within that localized zone of the aircraft 10. Some examples of the system applications that can be hosted on the CNI module 162 are the AC and DC power systems, cargo door system, passenger entry door system, landing gear system, and passenger cabin system. The computing functions that communicate to the CNI module 162 are TRUs 134, TRUs 142, ATUs 138, solid state switches of a breakers module 166, a generator control unit GCU 168 associated with one of the generator 34, 36, solid state power distribution modules 170, and remote data concentrators. The CNI module 162 communicates internally within the MEC 44, 46, 48 across internal data channel A 202 and internal data channel B 204 to the TRUs 134, 142, the ATUs 138, the breaker modules 166, the GCU 168, and the power distribution modules 170 as described in greater detail below.

The CNI module 162 will transmit and receive data to/from these computing functions. The CNI module 162 will also transmit and receive the status and health from other MECs 44, 46, 48 and aircraft computing systems. Each CNI module 162 manages the workload of an individual MEC 44, 46, 48 with knowledge of what is going on in other MECs 44, 46, 48. Once the information has been received by the CNI module 162 of a MEC 44, 46, 48, its computing function will determine which system needs the data, interpret the health of the data, respond to any power system anomalies, supply time sensitive information to computing functions that need it, perform system level logic algorithms, report airplane level system faults, and control the distribution of AC and DC power for that zone.

Figure 8:
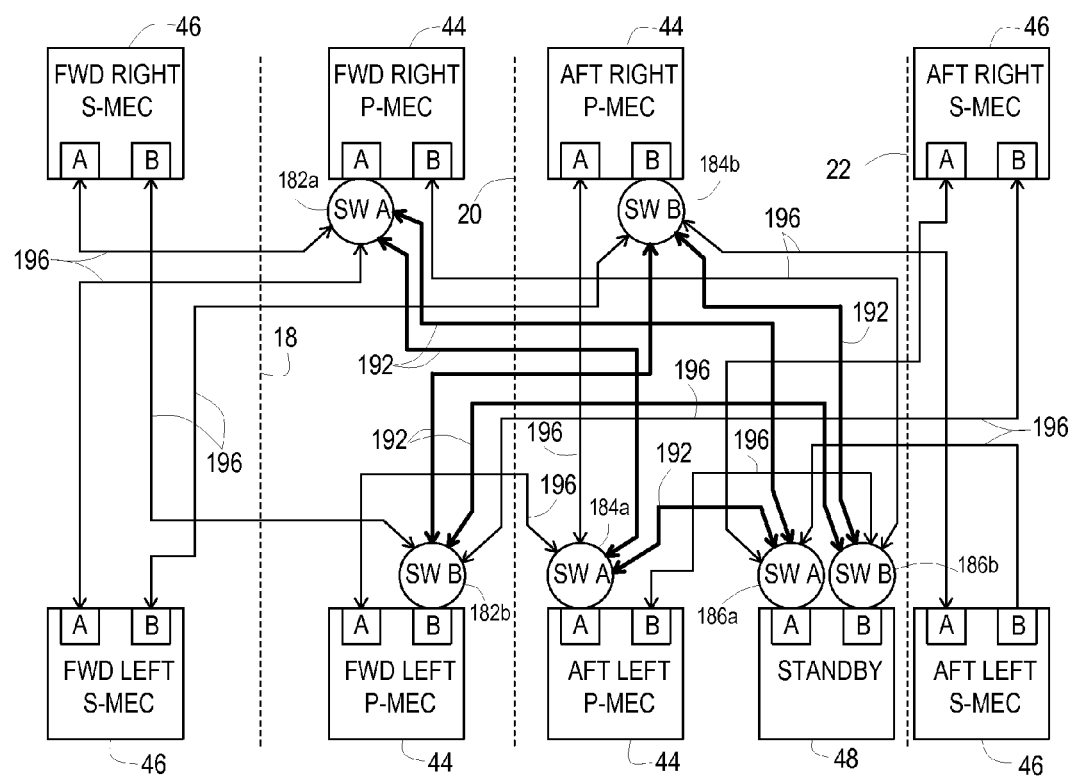
FIG. 8 illustrates one configuration of a data network structure with communication bus interfaces between spatially distributed MECs separated by section breaks according to at least one embodiment disclosed herein.

FIG. 8 illustrates the data network structure with communication bus interfaces between the spatially distributed MECs 44, 46, 48 separated by section breaks 18, 20, 22. This configuration allows each individual MEC 44, 46, 48 to communicate with other MECs 44, 46, 48 as well as provide the redundancy required to ensure continued communication across failures. Section break 20 defines forward and aft sections of the aircraft. The number of network communication switches needed is determined by the number of MECs 44, 46, 48 and the desired fault tolerance. FIG. 8 illustrates nine MECs 44, 46, 48 with three pairs of network switches 182a-b, 184a-b, 186a-b (hereinafter may be referred to collectively and/or generically as "network switches 182, 184, 186"). Each network switch 182, 184, 186 may be a multilayer network switch such as a layer-3 network switch that can receive secondary electrical power from the CNI modules 162 of each of the interfacing MECs 44, 46, 48. If there were more MECs 44, 46, 48 then more network switches would be required to achieve the same level of fault tolerance.

Each MEC 44, 46, 48 has A and B communication channels. Channels A and B of each primary MEC 44 connects to two corresponding A or B switches on either another primary MEC 44 or on a standby MEC 48. Each primary MEC 44 includes one switch 182, 184, 186 on either channel A or channel B, while standby MEC 48 in an aft section of the aircraft includes both switches of a pair of switches 182, 184, 186 on both A and B channels. Switches 182a, 184a, 186a correspond with channel A and switches 182b, 184b, 186b correspond with channel B. External communication data lines 192 indicate switch to switch data lines.

Generally, a network switch on each primary MEC 44 on one side of the section break 20 is connected to two other network switches of other primary or standby MECs 44, 48 where at least one of those MECs 44, 48 is on the other side of the section break 20 and one is on the opposite side of the aircraft 10. For example, network switch 182a of the forward right primary MEC 44 that is forward of the section break 20 is connected on the other side of the section break 20 to both network switch 184a on the aft left primary MEC 44 and to network switch 186a on the standby MEC 48. Network switch 182b on the forward left primary MEC 44 that is forward of the section break 20 is connected on the other side of the section break 20 to both network switch 184b on the aft right primary MEC 44 and to network switch 186b on the standby MEC 48. Network switch 186b on the standby MEC 48 is also connected to network switch 184b on the opposite side of the aircraft 10. Network switch 184a is also connected to network switch 186a of the standby MEC 48.

Each of the secondary MECs 46 also has two data channels with two other primary or standby MECs 44, 48. External communication data lines 196 indicate data connections of a network switch of a primary MEC 44 directly to a secondary MEC 44. One of the channels of each secondary MEC 48 is connected to a network switch on the same channel of a primary MEC 48 on the other side of the section break 20 and the other channel is connected to another secondary MEC 46. Therefore, FIG. 8 shows eight data bus connections crossing section break 20 and four data bus connections crossing each of the section breaks 18, 22. This configuration minimizes the amount of communication wiring across section breaks as well as the overall weight of wiring in the aircraft. Separation is maintained between each data bus by utilizing the space in the crown and the floor of the aircraft 10. Healthy CNI modules 162 can optimally respond to changing configurations of the power system in a coordinated fashion by utilizing local environment information and communications from other healthy CNI modules 162.

If any two MECS 44, 46, 48 are powered then the communication network will be active and data will be present so that those two MECS 44, 46, 48 can fully communicate with each other. This communication network is a fault tolerant network in that any one connection between a pair of MECs may be lost without reducing any MEC 44, 46, 48 functionality. Moreover, loss of any two communication connections at the same time between the MECs 44, 46, 48 at most results in the loss of data communication with only one of the MECs 44, 46, 48.

For example, loss of the network switch 182a on channel A of the forward right primary MEC 44 does not result in complete loss of communications to and from the forward right primary MEC 44 because communications to and from forward right primary MEC 44 may continue through channel B. Any other MECs 44, 46, 48 which had communicated via channel A with the forward right primary MEC 44 can directly communicate through channel B or via other MECs 44, 46, 48 that are connected to forward right primary MEC 44 via channel B. Also, if network switch 182a on channel A of the forward right primary MEC 44 was lost in addition to the channel B connection to the forward right secondary MEC 44, communications to and from the forward right primary MEC 44 would continue via channel B but then communications would be lost only with the forward right secondary MEC 44 because both channels A and B were lost.

One aspect of the present disclosure is distributed power control architecture. Power control is distributed to each MEC 44, 46, 48 as well as power itself. Based on the local data each individual MEC 44, 46, 48 collects, each MEC 44, 46, 48 performs its own power control of its associated zone to configure its own equipment loads 50 without having to rely on any other MECs 44, 46, 48. Only the data that is really necessary, such as the need to reroute power, is sent to the CNI modules 162 of other MECs 44, 46, 48.

Normal power up of an aircraft 10 on the ground is preferably a sequential power up of the MECs 44, 46, 48. Normal power up is done via the battery 598 which powers all the standby buses 160 in MECs 44, 46 via the static inverter 290 and the backup bus 148. Should the battery 598 not be available, a limited amount of exterior power from the external power unit 56 is sent to power up the standby MEC 48. Once the standby MEC 48 is powered up, power is then distributed from the standby MEC 48 to the each of the other primary and secondary MECs 44, 46 to power up their CNI modules 162 and configure contactors within each MEC 44, 46 as appropriate with the power sources that are available. On the other hand, a sequential power up is not utilized if a MEC 44, 46 becomes unpowered during normal flight operations. If the CNI module 162 in one of the MECs 44, 46 has no primary power, the low power interconnection between two MECs 44, 46, such as a primary MEC 44 and a secondary MEC 44 with a distribution feed 100, provides a means to still power the unpowered MEC 44, 46 as explained above.

The CNI module 162 reads input/output communications from other systems or LRUs as well as configuration data from other MECs 44, 46, 48. Broadcasting each MEC's 44, 46, 48 configuration data allows each of the other MECs 44, 46, 48 to determine what is going on elsewhere in the aircraft 10. The CNI module 162 then uses this data to configure breakers and contactors within its MEC 44, 46, 48 and then writes configuration data onto channel A or B about the equipment loads 50 within its zone to broadcast to the other MECs 44, 46, 48 so that other MECs 44, 46, 48 can do the same. Each CNI module 162 checks the validity of the communications input/output and environmental data it receives and, if necessary, refines it to determine its own environment data and states of its breakers. Once the CNI module 162 figures out how it wants to command its breakers and contactors within its zone, it then sends its configuration data out to the other MECs 44, 46, 48.

The CNI module 162 of each MEC 44, 46, 48 only controls the equipment loads 50 within the boundaries assigned to that MEC 44, 46, 48. Each CNI module 162 of a particular MEC 44, 46, 48 does not set the equipment load configuration of other MECs 44, 46, 48 or decide how to configure their breakers or contactors. However, all the MECs 44, 46, 48 still may interact with one another to provide a coherent and unified power transfer function for the primary and secondary power systems of the aircraft 10. The CNI modules 162 of MECs 44, 46, 48 that are functioning properly are able to react to a MEC 44, 46, 48 that has operational issues and reroute power across power tie buses 76, 78, 80, distribution feeds 98, 100 and crossties 102, 104, 106, 108 even in conjunction with additional failures. The computing and networking architecture is both fail safe and fault tolerant. If a CNI module 162 has an operational issue, all of its connected load will enter a predefined default "fail safe" state. Adjacent CNI modules 162 do not have the capacity or authority to control other equipment loads outside of their zone.

Figure 9:
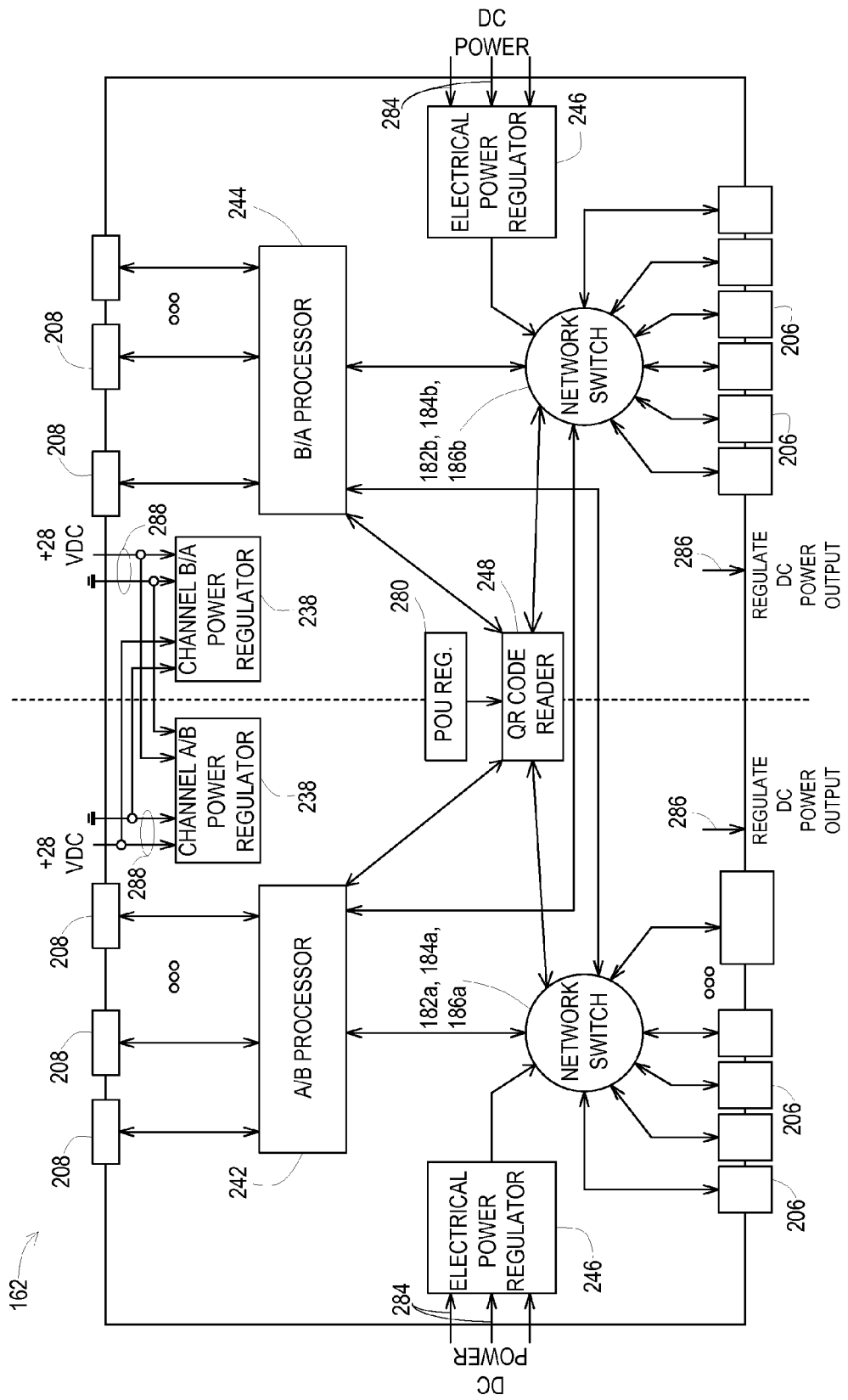
FIG. 9 illustrates one configuration of the computing and interface module for distributed computing functions and gateway routing of bi-directional data according to at least one embodiment disclosed herein.

The CNI module 162 shown in FIG. 9 includes one network switch 182, 184, 186 on one side of the CNI module 162 corresponding with channel A and another network switch 182, 184, 186 on the other side corresponding with the channel B. Both network switches 182, 184, 186 have one or more ports 206 for making external data communication connections. Each side of the CNI module 162 also has one or more ports 208 for making internal data communication connections within the MEC 44, 46, 48 as described in greater detail below. The CNI module 162 includes two multi-core processors 242, 244 for running multiple instructions associated with processing channel A and channel B data communications. Each processor 242, 244 can process instructions for receiving and transmitting communication data within a MEC 44, 46, 48 at ports 208 or for receiving and transmitting communication data outside of the MEC 44, 46, 48 with either network switch 182, 184, 186 through the ports 206. One of the processors 242, 244 on one side of the CNI module 162 corresponds with one communication channel and the other processor 244 on the other side of the CNI module 162 corresponds with the other communication channel. However, each processor 242, 244 has a crossover to the other network switch 182, 184, 186 for the other communication channel so that each processor 242, 244 can read and process both channel A and B communications.

Each component or LRU 52 placed on a truss system of a MEC 44, 46, 48 such as the CNI module 162 may include a barcode reader 248 for optically reading labels. The barcode reader 248 may be a quick response (QR) code reader for reading QR codes. Barcodes (not shown) may be placed in the MEC, 44, 46, 48 or elsewhere in the aircraft 10 in proximity of the barcode reader 248. The barcode reader 248 reading barcodes allows the MEC 44, 46, 48 to input information such as identification, position, time tracking and other configuration information to set software parameters of the CNI module 162 of the MEC 44, 46, 48. For example, the barcode reader 248 may read the position of the CNI module 162 so that the MEC 44, 46, 48 knows which section or which side of the aircraft 10 it is located in. Also, determining the location of the CNI module 162 allows the MEC 44, 46, 48 to determine the nearest equipment loads 50. The configuration information may also be transmitted to other MECs 44, 46, 48, elsewhere in the aircraft 10, or a central facility outside of the aircraft 10 such as a maintenance facility.

Based on how much power is distributed from the MEC 44, 46, 48, the CNI module 162 may require one or more additional power inputs 288, such as 28 VDC or 115 VAC, and power regulators 238, from one or more transfer layers of a truss system as explained below. For example, 28 VDC is input to point of use regulator 280 for the barcode reader 248. Each CNI module 162 also receives one or more DC power inputs 284 from power outputs 286 of the CNI modules 162 of one or more other MECs 44, 46, 48 to power one or both network switches 182, 184, 186. Power inputs 284 and power regulators 246 provide redundancy to prevent a single power failure from taking down any of the processing or communication channels.

If there is a complete loss of power to a MEC 44, 46, 48 at inputs 288 from a transfer layer of the truss system, then the MEC 44, 46, 48 with the CNI module 162, network switches 182, 184, 186, the power regulators 246, and the barcode reader 248, may still be powered. Because of the one or more DC power inputs 284 routed from redundant power outputs 286 of other CNI modules 162 of other MECs 44, 46, 48, the CNI module of the unpowered MEC 44, 46, 48 never loses power and is able to reroute power from an adjacent MEC and then powers up one or more transfer layers of its own MEC 44, 46, 48. The MEC 44, 46, 48 can then still service some or all of its equipment loads 50 and the CNI module 162 remains fully functional and can communicate with other CNI modules 162 thereby keeping truss system of the MEC 44, 46, 48 and the communications network active.

FIGS. 10A-10D illustrate different configurations of the high voltage primary power switching bus structure of each of the primary MECs 44 shown in FIGS. 5A-5E. Each may be designated as R1, R2, L1 or L2 based on which generator 34a, 34b, 36a, 36b directly powers each of the four primary MECs 44 and whether the four primary MECs 44 are forward or aft and whether they are on the left or on the right side of the aircraft 10. R1 corresponds with the forward right primary MEC 44 that receives primary power from generator 36a. R2 corresponds with the aft right primary MEC 44 that receives primary power from generator 36b. L1 corresponds with the forward left primary MEC 44 that receives primary power from generator 34a. L2 corresponds with the aft left primary MEC 44 that receives primary power from generator 34b.

Figure 10A:
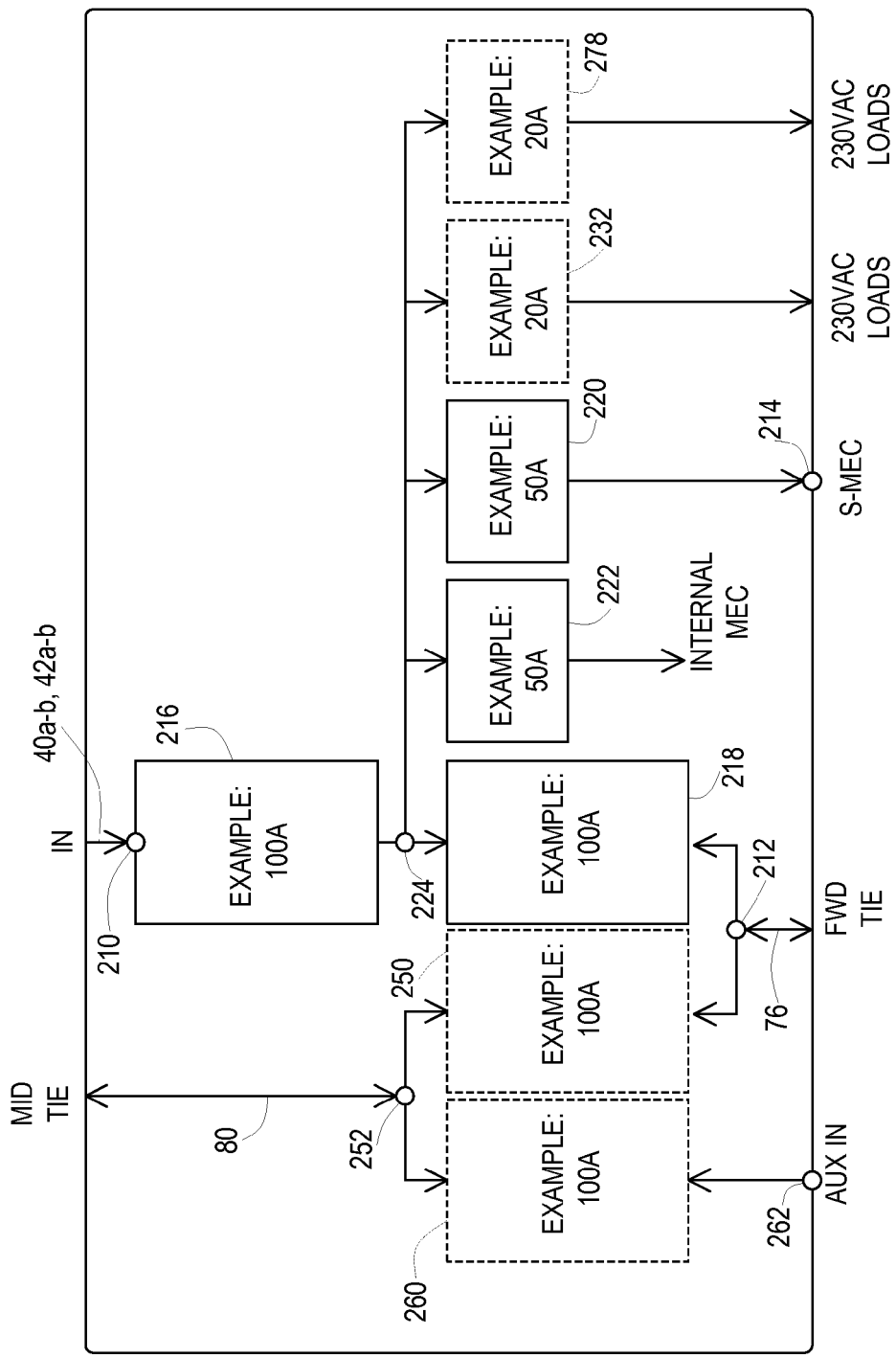
Figure 10B:
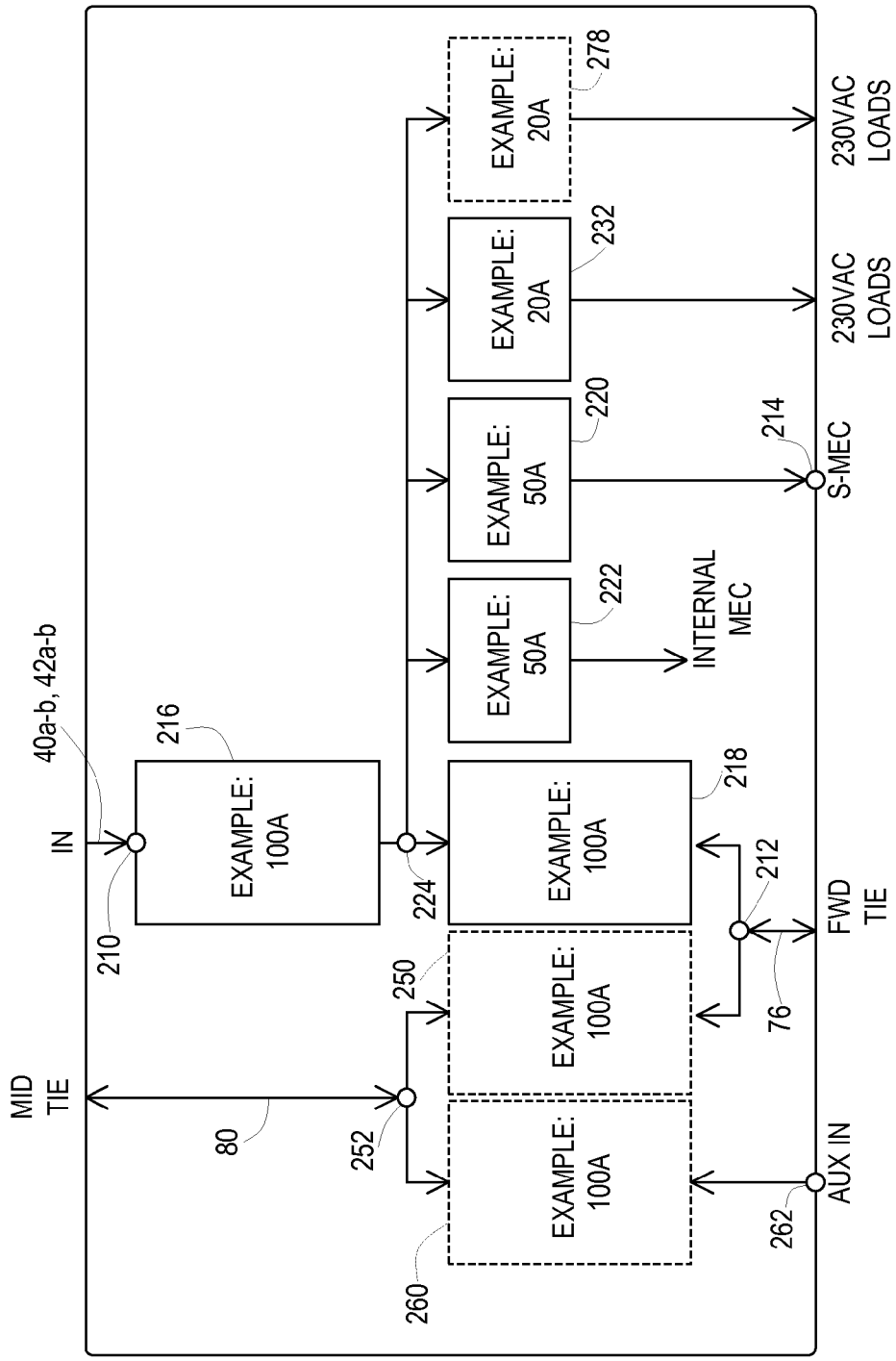
Figure 10D:
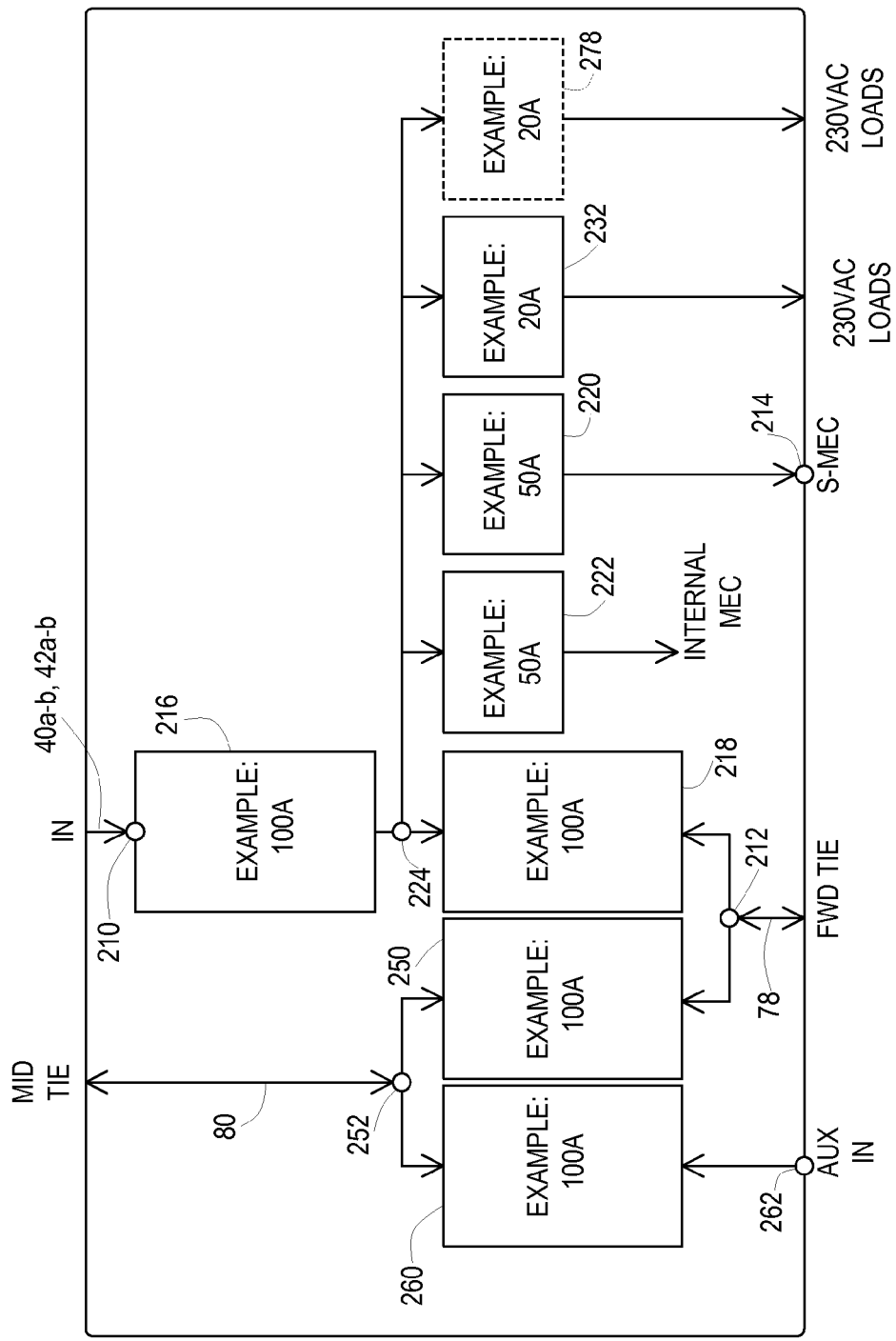

FIG. 10A illustrates the high power portion 120 with primary power switching bus 96a and solid state switching devices of the forward right primary MEC 44 (R1) of FIGS. 5A and 5B. FIG. 10B illustrates the high power portion 120 with primary power switching bus 96a and solid state switching devices of the aft right primary MEC 44 (R2) of FIGS. 5A and 5C. FIG. 10C illustrates the high power portion 120 with primary power switching bus 96a and solid state switching devices of the forward left primary MEC 44 (L1) of FIGS. 5A and 5D. FIG. 10D illustrates the high power portion 120 with primary power switching bus 96a and solid state switching devices of the aft left right primary MEC 44 (L2) of FIGS. 5A and 5E. Together, FIGS. 10A-10D depict a common architecture and layout of solid state switching devices that can provide connectivity for each primary MEC 44.

FIG. 10A best illustrates the primary busing structure, solid state elements, and connections for the forward right primary MEC 44 (R1) which has the least number of solid state elements in comparison to the other primary MECs 44 positioned elsewhere. However, the minimal structure depicted in FIG. 10A may be expanded to include the additional solid state elements (shown in phantom) in order to include the required functionality for any of the other primary MECs 44. The additional solid state elements may or may not be populated in all slots in all installed MECs 44, 46, 48.

Each of the four configurations of FIGS. 10A-10D for the four primary MECs 44 have a primary power connection 210 from one of the main generators 34a, 34b, 36a, 36b, and a connection 212 to either the forward or aft ties 76, 78. Each configuration also includes an output connection 214 to an associated secondary MEC 46. Each also includes two high current solid state contactors 216, 218 and two low current solid state contactors 220, 222. The two high current contactors 216, 218 are connected together at connection 224. One of the high current contactors 216 is also connected at connection 210 for turning on and off main primary power and the other high current contactor 218 is also connected at the connection 212 for the forward or aft ties 76, 78 depending on whether the primary MEC 44 is in a forward or aft section of the aircraft 10. The low current contactor 220 is connected to a connection 214 for the associated secondary MEC 46. The other low current contactor 222, in combination with the distribution feed 98 as described in greater detail below, is for turning on and off power between the high power portion 120 and the low power portion 122 of each primary MEC 44.

The left forward primary MEC 44 (L1) depicted in FIG. 10C includes another high current contactor 250 between a connection 252 from the mid tie 80 and the connection 212 for the forward tie bus 76. The aft left primary MEC 44 (L2) depicted in FIG. 10D includes the additional high current contactor 250 that the left forward primary MEC 44 (L1) includes as well as another high current contactor 260 between the connection 252 for the mid tie bus 80 and an input connection 262 for the auxiliary power unit generator 54. The aft left primary MEC 44 (L2) also includes the same low current contactor 232 to the standby MEC 48 where high voltage AC power is sent across tie 270 and to auto-transformer rectifier unit (ATRU) 272 and to bus 274.

The aft right primary MEC 44 (R2) depicted in FIG. 10B also includes a low current contactor 232 for connecting the standby MEC 48 with high voltage AC power across tie 234 to ATRU 236 and to bus 240. All four configurations also have the option of having additional contactors such as a low current contactor 278 for turning on and off power requiring 230 VAC as shown in each of the FIGS. 10A-10D.

Figure 11:
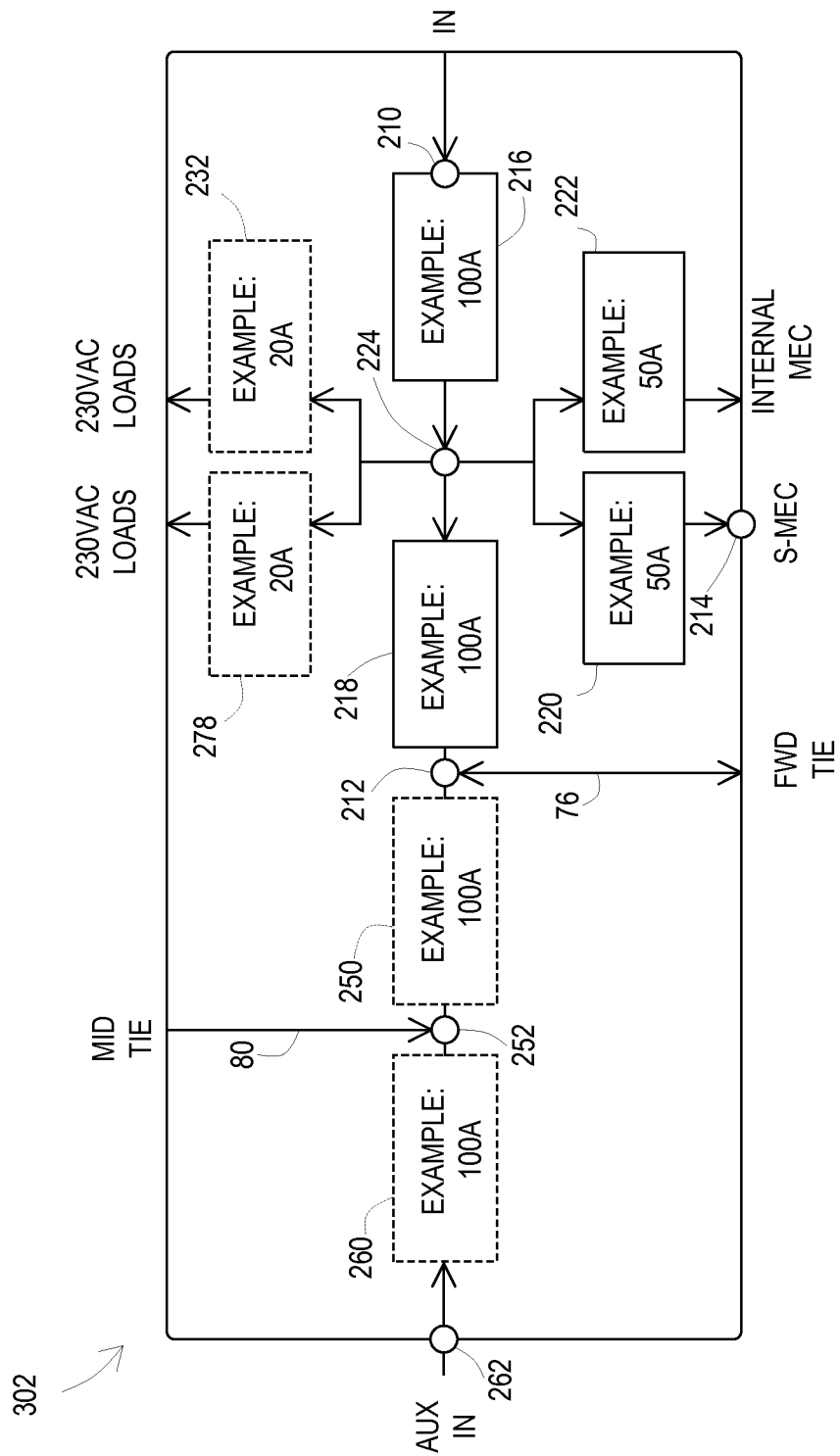
FIG. 11 illustrates a common structure and layout of a primary power switching network device having a common power input source and a plurality of common power outputs for use with the primary MECs according to at least one embodiment disclosed herein.

To facilitate manufacturing and inventory availability, the varying architectures shown in each of the FIGS. 10A-10D can be rearranged into a single structure having a similar layout of a primary power switching network device (PPSND) 302, as shown in FIG. 11, with optional contactors 232, 250, 260, 278 for various loads based on the primary power switching configuration and where the MEC 44 is within an aircraft 10 as explained above. Each PPSND 302 corresponds with the high power portion 120 of each primary MEC 44 and is configured to share common sources and outputs with options for additional contactors 232, 250, 260, 278 for receiving primary power directly from a standby MEC 48 or for receiving primary power from auxiliary power unit generator 54 which are connected via the forward, aft and mid tie buses 76, 78, 80 as needed. As shown in FIG. 5C the high power primary power switching bus 96a of aft right primary MEC 44 is connected to the standby MEC 48 with tie 234. In FIG. 5D, the forward left primary MEC 44 is connected by the forward tie bus 76 with contactor 218a-c to the forward right primary MEC 44 and connected by the mid tie bus 80 with contactors 250a-c to the aft left primary MEC 44. The aft left primary MEC 44 as shown in FIG. 10D has the most contactors as a result of being connected to other primary MECs 44 with the aft and mid tie buses 78, 80 as well as the standby MEC 48 with contactors 232a-c by the tie 270.

A set of substantially identical PPSNDs 302a-c as shown in FIGS. 12A-12C, can be used with a primary MEC 44 to receive three-phase primary power from one of the generators 34, 36. Although the PPSNDs 302a-c shown are labeled for use in combination with the forward right primary MEC 44 (R1), the three PPSNDs 302a-c may also be used to receive three-phase power for either of the other primary MECs 44. Each of the primary power feeders 40, 42 preferably is a four conductor power wire connected to each of the primary MECs 44 where three of the conductors carry either of phases A, B or C of the three-phase power. The forth conductor can be a neutral wire connected to a fourth PPSND.

Still referring to FIG. 11 and FIGS. 12A-12C, phase A power is received at connection 210a to power the primary power switching bus 96a of the PPSND 302a of FIG. 12A, phase B power is received at connection 210b to power the primary power switching bus 96b of the PPSND 302b of FIG. 12B, and phase C power is received at connection 210c to power the primary power switching bus 96c of the PPSND 302c of FIG. 12C. Solid state elements are depicted by squares in each of FIGS. 12A-12C and sets of the solid state elements constitute the contactors 216, 218, 220, 222, 232, 250, 260 and 278 as depicted in FIG. 11.

In FIGS. 12A-12C, reference numbers ending with "a", "b" or "c" may refer to components utilizing phase A power, phase B power or phase C power, respectively. However, such reference numbers themselves may also refer collectively and/or generically to the same components without specifically referencing a particular phase of power. Contactors 210a-c power the high power primary power switching buses 96a-c, respectively. Primary power comes from each of the primary power switching buses 96a-c across contactors 218a-c to the forward tie bus 76a-c (or the aft tie 78a-c depending on whether the primary MEC 44 is in a forward or aft section of the aircraft 10). Alternatively, power could come from the forward tie bus 76a-c to the primary power switching bus 96a-c across contactors 218a-c. Primary power could also be provided to and from the mid tie bus 80a-c at connections 252a-c and across contactors 250a-c in association with the primary power switching buses 96a-c. Primary power could also be provided from the auxiliary power unit generator 54 with a power tie 130 connected to connection 262a-c and across contactors 260a-c to the primary power switching buses 96a-c.

Primary power is provided from the primary power switching buses 96a-c across contactors 220a-c to the output connections 214a-c for the secondary MEC 46. Primary power is also provided from the primary power switching buses 96a-c across contactors 222a-c to output connections 390a-c and across distribution feed 98 to power the low power portion 122 of the primary MEC 44. Three-phase primary power from the output connections 390a-c of the PPSNDs 302a-c may be sent through a truss system to other components within the same MEC 44, 48 as the PPSNDs 302a-c. Distribution feed 98 is preferably a four wire conductor with a first wire for phase A power connected to output connection 390a, a second wire connected to output connection 390b, and a third wire connected to output connection 390c.

Three-phase high power may be distributed directly from the high power portion 120 of a primary MEC 44 to optional or auxiliary loads by utilizing output connections 340a-c or output connections 342a-c on the PPSNDs 302a-c shown in FIGS. 12A-12C. Contactor 232 and contactor 278, shown in FIG. 11, correspond with output connections 340a-c and output connections 342a-c shown in FIGS. 12A-12C. Power of 230 VAC to and from the auxiliary loads is controlled by the contactors 232a-c, 278a-c of the PPSNDs 302a-c. If the PPSNDs 302a-c were being utilized in the left aft primary MEC 44 (L2) as shown in FIGS. 5A and 5E, one of the auxiliary three-phase loads connected to output connections 340a-c of the PPSNDs 302a-c would be the standby MEC 48. In such case, the tie 270 providing three-phase power from the standby MEC 48 would be a four wire conductor with a separate wire connected to each of the three PPSNDs 302a-c and the fourth wire as a neutral connected to a fourth PPSND 302. Although FIGS. 12A-12C depict direct connections for a total of two different three-phase loads, many other three-phase loads may be serviced by a particular primary MEC 44 with additional connections.

One or more of the MECS 44, 46, 48 may also include an integrated truss system having a mounting structure of one or more data and/or power transfer layers separated by one or more insulation layers. The truss is configured to facilitate easy installation or replacement within an aircraft 10 and may be constructed of rigid or flexible materials such as sheet metal, thermoplastics, composites, or some other suitable material. In an aircraft, power or data could be transferred to various locations on the mounting structure of the truss system or to various locations in the aircraft. In some configurations, a via or a mechanism such as a truss interconnect can electrically connect one or more power or data lines in one layer to one or more power or data lines in one or more different layers of the integrated truss system, as described in U.S. patent application Ser. No. 13/930,024, entitled TRUSS INTERCONNECT, filed 28 Jun. 2013, which is incorporated herein by reference in its entirety. The interconnect can also be used to electrically interconnect a LRU mounted to the top surface layer of the integrated truss system and to send power into the truss or from the truss into the LRU. An LRU with the PPSNDs 302a-c has a conductive boss (projection) and as the interconnect passes through the LRU and into the truss system the interconnect expands into the boss as well as the transfer layers of the truss system to make electrical connections between the LRU and the truss system.

In some configurations, the integrated truss system may electrically connect both power and data systems. In further configurations, the truss interconnect can also provide a mechanical connection between one or more layers of the integrated truss system. In additional configurations, the truss interconnect may be configured for multiple insertions and extractions, allowing the reuse of the truss interconnect.

Figure 13:
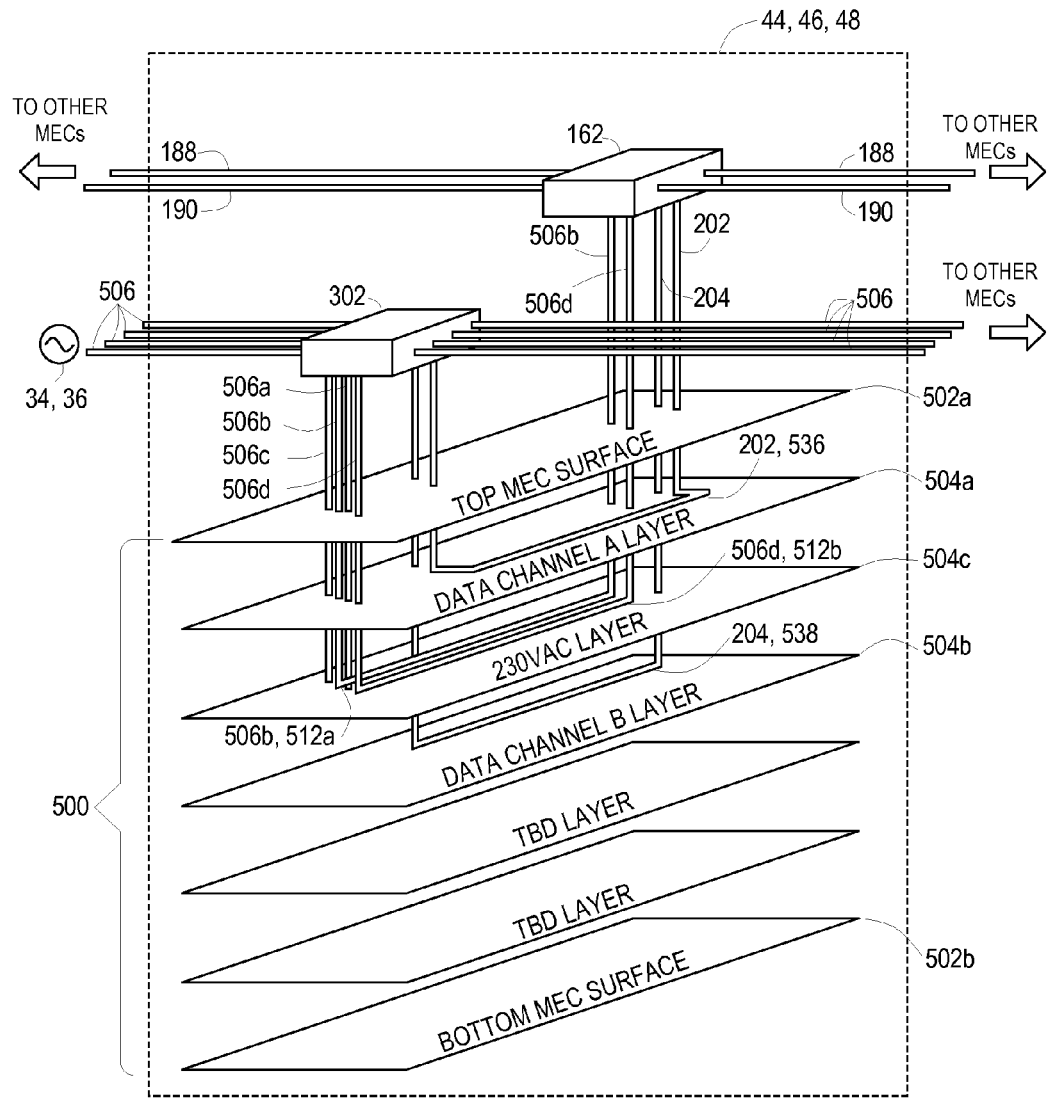
FIG. 13 illustrates an exploded perspective view of a multi-layered integrated truss system of a MEC according to at least one embodiment disclosed herein.

FIG. 13 illustrates an exploded, perspective view of a multi-layered integrated truss system 500 of a MEC 44, 46, 48. The integrated truss system 500 may include insulation layers 502a-502b (hereinafter referred to collectively and/or generically as "insulation layers 502") and transfer layers 504a-504c (hereinafter referred to collectively and/or generically as "transfer layers 504"). In some configurations, the insulation layers 502 and the transfer 504 layers are alternately arranged among each other such that the insulation layers at least partially electrically separate the transfer layers 504 from one another. In further configurations, the insulation layers 502 are configured to, at least partially, physically separate one or more of the transfer layers 504 from one or more other transfer layers 504. Also, in some configurations one or more of the insulation layers may act as a smoke or water drip barrier between the passenger and cargo compartments.

Components of a MEC 44, 46, 48 may be detachably secured to the truss system 500. A portion of the power busing network system 90 of FIG. 3, for example corresponding with the high power portion 120 of a primary MEC 44, with the PPSNDs 302a-c, is housed in an LRU 52 mounted to the top surface insulation layer 502a of the truss system 500. Also inside the LRU 52 with the power busing network system 90 is a microprocessor that receives channel A and B data inputs from the CNI module 162 to control all the contactors 216, 218, 220, 222, 232, 250, 260 and 278.

Three-phase primary power 506a-d (hereinafter may be referred to collectively and/or generically as "three-phase primary power 506") is provided from one of the main generators 34, 36 to the PPSNDs 302a-c inside the power busing network system 90. Phase A power 506a, phase B power 506b, or phase C power 506c, or all three, may be routed from the output connections 390a-c through the insulation layers 502 to one or more transfer layers 504 of the truss system 500. The neutral 506d of the three phase primary power 506 also may be routed through the insulation layers 502 to one or more transfer layers 504 of the truss system 500. Communication data is sent from one MEC 44, 46, 48 to any other MEC 44, 46, 48 across two data channels 188, 190 (commonly referred to as channels A and B). As shown in FIG. 13, the mounting structure of the truss system 500 provides separate layers configured to provide separate communication channels to system components mounted to the truss system 500. Both data channels 188, 190 may be routed through the insulation layers 502 to one or more transfer layers 504 of the truss system 500. For example, the transfer layer 504a includes data transfer path 536 and transfer layer 504b includes data transfer path 538. The data transfer paths 536, 538 may be separated from one another by one or more layers 502, 504 such as transfer layer 504c. Data communications back and forth between the power busing network system 90 with PPSNDs 302 and the CNI module 162 are sent back and forth across the data channels 188, 190. Data channel 188 passes through the transfer path 536 of transfer layer 504a and data channel 190 passes through the transfer path 538 of transfer layer 504b.

In some configurations, the transfer layers 504 are configured to include one or more power or data transfer paths, or both. For example, the transfer layer 504c may include power transfer paths 512a and 512b which correspond with phase B power 506b and neutral 506d of the three primary phase power 506. The power transfer path 512a receives phase B power, of 230 VAC for example, and transfers it to another LRU 52 mounted to the truss system 500 such as the CNI module 162 shown in FIG. 13. Transfer path 512b is the current return path across the neutral 506d from the CNI module 162 back to one of the PPSNDs 302.

Each MEC 44, 46, 48 also includes at least one power distribution module 170 for distributing secondary power from the MECs 44, 46, 48. Each distribution module 170 may be configured as one or more LRUs 52. Each distribution module 170 preferably receives all three phases but distributes them to single phase leads in a balanced manner. As shown in FIG. 13, phase A 506a and phase B 506b are provided through two different transfer layers 504 of the truss system 500, and then to distribution modes 170. Each distribution module 170 then distributes single phase secondary power to the low power equipment loads 50 within the assigned zone of each particular MEC 44, 46, 48. The equipment loads 50 associated with each MEC 44, 46, 48 are preferably distributed evenly across all three power phases. Preferably, each of the low power equipment loads 50 is connected to a distribution module 170 with a twisted electrical conductor pair. Although the present application depicts a particular number of connections in one or more of the Figures, any number of equipment loads 50 may be serviced by a MEC 44, 46, 48 subject to the amount of secondary power available.

Figure 14:
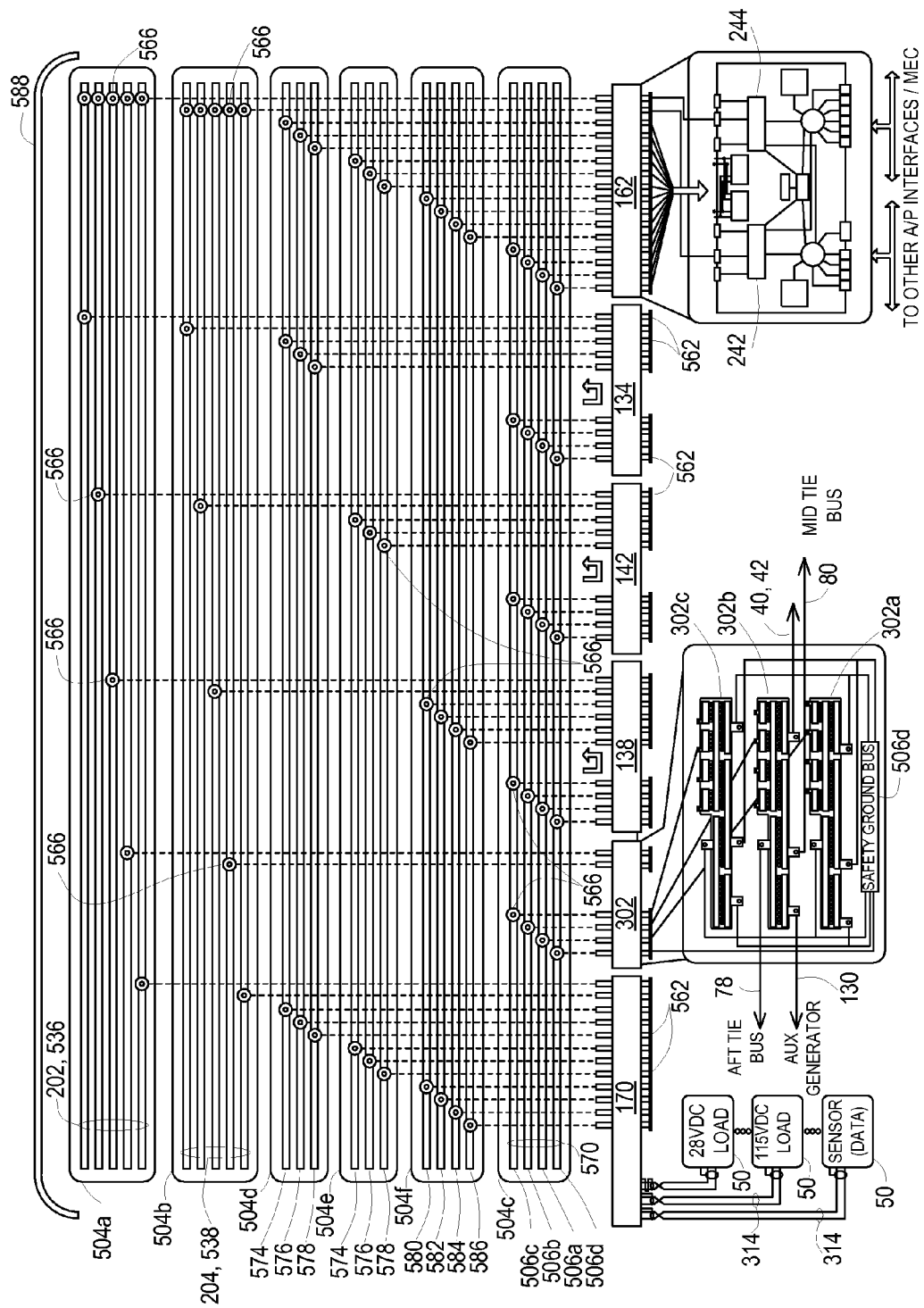
FIG. 14 illustrates one configuration of a primary MEC with multiple power and communication transfer layers according to at least one embodiment disclosed herein, FIG. 15 generally illustrates one configuration of three-phase primary power routed from main generators to multiple transformer rectifier units (TRUs) and autotransformer units (ATUs) resulting in zero direct current (DC) offset voltage according to at least one embodiment disclosed herein.

FIG. 14 illustrates a primary MEC 44 with several layers of a truss system. The primary MEC 44 includes TRUs 134, 142, the ATU 138, the CNI module 162, distribution modules 170 and a PPSND 302. Primary MECs 44 include a PPSND 302 and MECs 46, 48 do not. A secondary MEC 46 could be depicted in a manner similar to the MEC 44 in FIG. 10B except without a PPSND 302. The two TRUs 134, 142, the ATU 138, the CNI module 162, distribution modules 170 and the PPSND 302 are electrically interconnected to the traces or metalized interconnects in the transfer layers 504 by inserting interconnector mechanisms 562. The interconnection mechanisms 562 are inserted through each of the TRUs 134, 142, the ATU 138, the CNI module 162, distribution modules 170 and the PPSND 302 and into vias 566 in each of the transfer layers 504.

The truss system includes transfer layer 504a with trace 536 for channel A and transfer layer 504b with trace 538 for channel B. Each of the TRUs 134, 142, the ATU 138, distribution modules 170 and the PPSND 302 are connected to a dedicated channel A trace 536 and to a dedicated channel B trace 538. However, the number of traces, 536, 538 on each transfer layer 504 depends on the protocol. In other embodiments, the TRUs 134, 142, the ATU 138, the distribution modules 170 and the PPSND 302 could all be connected to the same channel A trace 536 and to the same channel B trace 538.

The truss system in FIG. 14 also includes transfer layers 504c, 504d, 504e and 504f. Transfer layer 504c includes traces 570 with three-phase primary power 506, such as 230 VAC, for powering the truss system of the MEC 44, 46, 48 and the systems connected to it. A respective trace 570 corresponds with phase A power 506a, phase B power 506b, phase C power 506c, and neutral 506d. The two TRUs 134, 142, the ATU 138, the CNI module 162, and the PPSND 302 are connected to the traces 570 of transfer layer 504c with interconnector mechanisms 562 through vias 566. The three-phase primary power 506 is provided from the generators 34, 36 through the PPSND 302 to the transfer layer 504c. The two TRUs 134, 142, the ATU 138, and the CNI module 162 are then powered by receiving the three-phase primary power 506 from the traces 570 of the transfer layer 504c.

Secondary power is distributed from the TRUs 134, 142 and the ATU 138 to transfer layers 504d, 504e, 504f. Transfer layers 504d, 504e are low voltage layers, such as 28 VDC, and each includes a positive trace 574, a negative trace 576, and a neutral trace 578. One of these transfer layers 504, such as transfer layer 504e, may provide standby power from the RAT 128 or a fuel cell via the second TRU 142. 28 VDC power from the traces 574, 576, 578 of transfer layers 504d, 504e is distributed to the distribution module 170. Transfer layer 504f is a low voltage three-phase layer, such as 115 VAC, that includes phase A power 580, phase B power 582, phase C power 584 and a neutral 586. 115 VAC power from the traces of transfer layer 504f is also distributed to the distribution module 170.

The distribution module 170 is connected to the traces of transfer layers 504*d*, 504*e*, 504*f* for secondary power and also to the traces 536, 538 for channels A and B 202, 204 in order to distribute the secondary power to equipment loads 50 with the twisted and shielded electrical conductor pairs 314. The distribution module 170 is not connected to transfer layer 504*b* with three-phase primary power 506 because primary power is not distributed from the distribution module 170. Communication data from channels A and B 202, 204 of truss transfer layers 504*a*, 504*b* controls when the distribution module 170 turns on and off secondary power to the twisted and shielded electrical conductor pairs 314 to service the equipment loads 50.

As shown in FIG. 14, the CNI module 162 is connected to every trace in every layer 504 of the truss system of the MEC 44, 46, 48. Because there are multiple voltage inputs to the CNI module 162, power regulators perform conversions to the needed voltages. If any of the traces on one or more of the layers 504 become powered, the CNI module 162 becomes active. For example, if all the MECs 44, 46 loses primary power, power could be provided to the standby MEC 48 with the RAT 128 or a fuel cell thereby providing power to traces 574, 576, 578 of the standby layer 504*e*. Power in the traces 574, 576, 578 of the transfer layer 504*e* would activate the CNI module 162. The CNI module 162 also receives communication data for use with the network switches 182, 184, 186 from both channels A and B 202, 204 from each of the traces 536, 538 of the transfer layers 504*a*, 504*b*.

Figure 17:
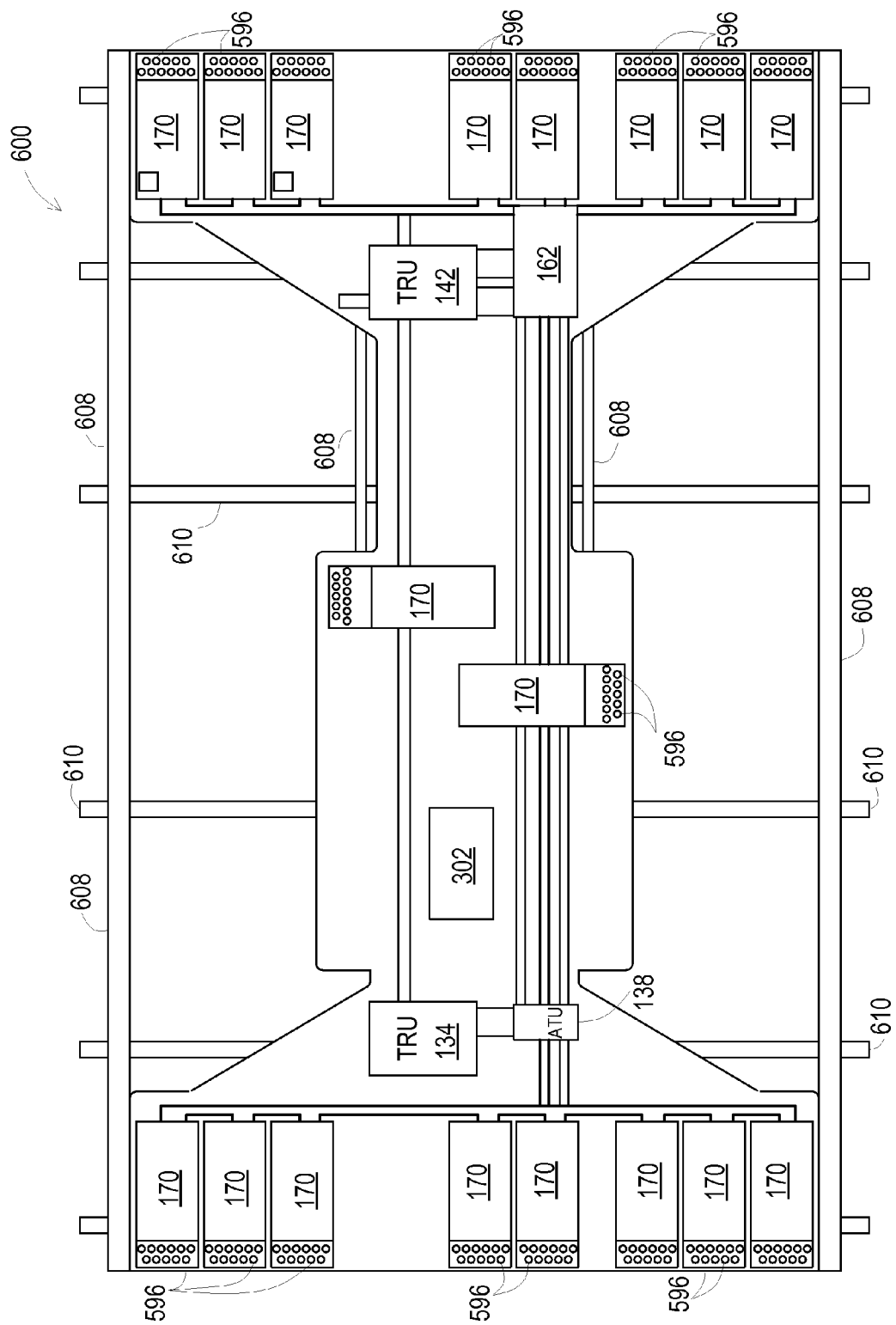
FIG. 17 illustrates one configuration of an integrated truss system of a MEC within the floor of an aircraft according to at least one embodiment disclosed herein.

FIG. 14 also depicts a barrier 588 preferably positioned above the transfer layers 504 of the truss system of a MEC 44, 46, 48. If the truss system were positioned within the floor structure as shown in FIG. 17, the barrier serves as a smoke barrier for obstructing smoke from the cargo compartment from entering the passenger compartment and/or as a water drip barrier for obstructing dripping water anywhere with the aircraft 10. For example, the barrier 588 could obstruct water from dripping onto electrical components of a MEC 44, 46, 48. Alternatively, or in addition to the barrier 588, one or more of the insulation layers 502 could be the smoke and/or water drip barrier. For example, the uppermost insulation layer 502 of the truss system could be configured to act as a barrier to water and smoke.

In existing composite aircraft, the current return network provides a fault current return path, a personal safety protection path, and lightning protection path for the aircraft systems. However, as explained above, the current return network also provides a significant amount of wire weight to an aircraft which is undesirable.

The current return networks of these known aircraft are also susceptible to large voltage offsets. Both AC and DC voltages may be measured on the current return network. The return currents of all the equipment loads throughout the aircraft on the current return network are cumulative and therefore a voltage drop is created along the current return network as measured from the power source grounding point to the load grounding points. The voltage drop at different points along the current return network increases from the power source grounding points toward the back of the aircraft proportional to the impedance of the current return network and the current passing through it.

Figure 15:
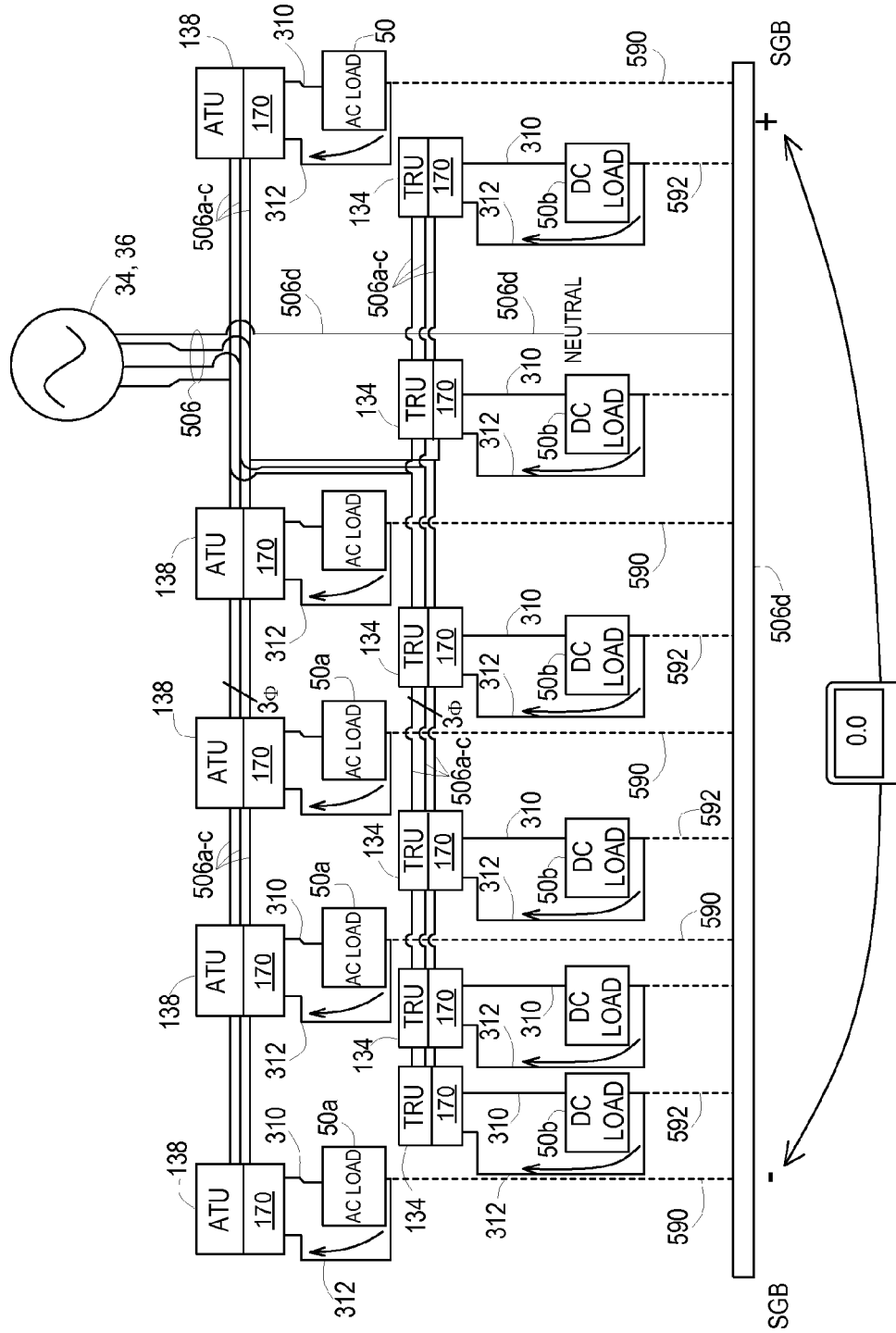

FIG. 15 generally illustrates three-phase (3Φ) primary power 506 is routed from one or more of the main generators 34, 36 to multiple isolated TRUs 134 and non-isolated ATUs 138. The TRUs 134 and ATUs 138 are distributed throughout the aircraft 10 as part of the distributed architecture as best shown in FIG. 15. At least one TRU 134 and at least one ATU 138 corresponds with one of the MECs 44, 46, 48. Because the TRUs 134 are isolated they can be grounded wherever it is convenient. Also, because the TRUs 134 are distributed, the TRUs 134 can be grounded at different locations and, therefore, their DC return currents remain local to each respective MEC 44, 46, 48. However, the return currents are no longer cumulative which results in a DC offset voltage of zero.

Figure 16:
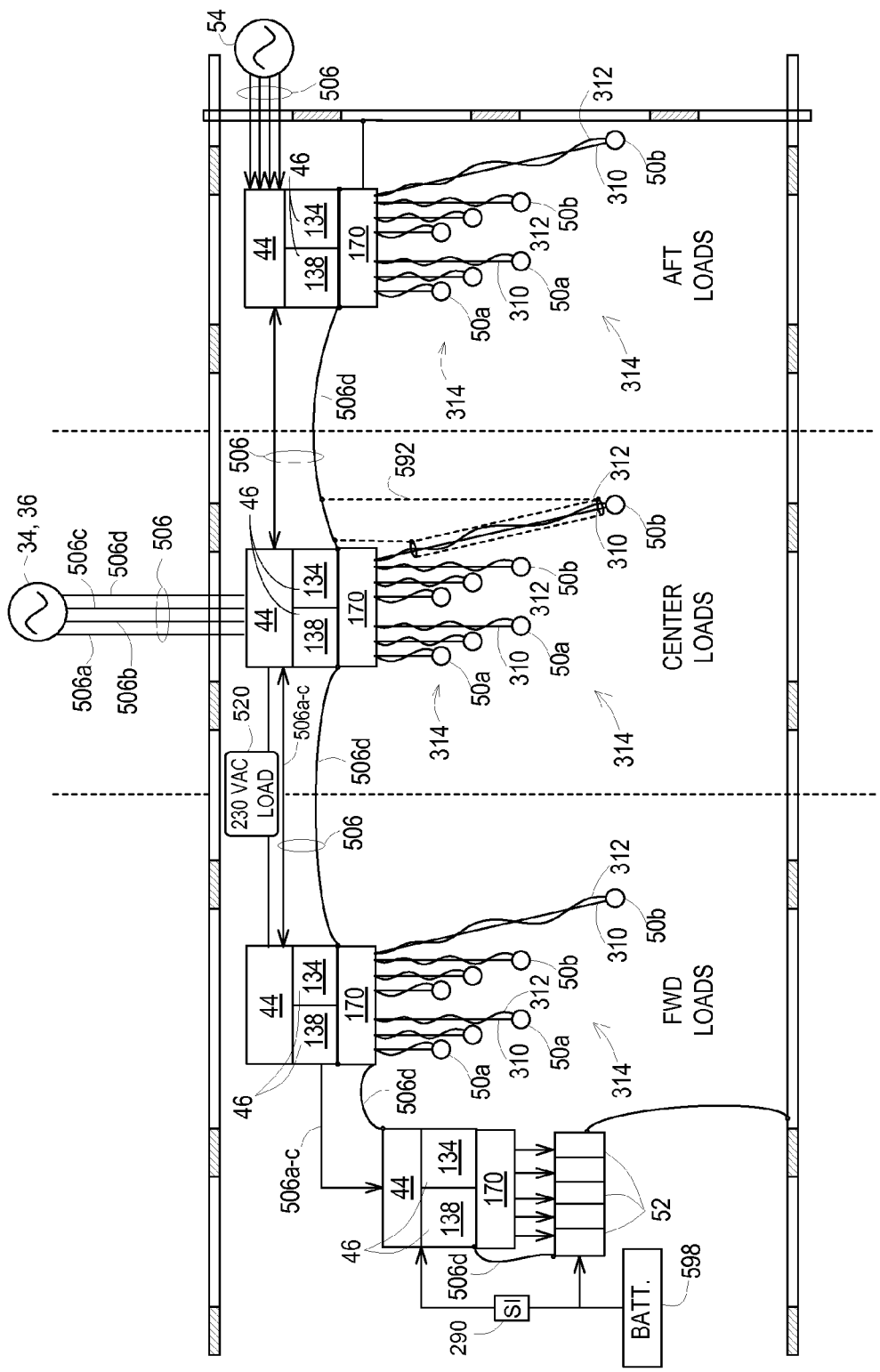
FIG. 16 illustrates one configuration of the distribution of either alternating current (AC) or DC power from the TRUs and ATUs to equipment loads utilizing twisted and shielded electrical conductor pairs according to at least one embodiment disclosed herein.

FIG. 16 also generally illustrates the distribution of either AC or DC power from an ATU 138 or a TRU 134, respectively. However, more specifically as described above, the primary power 506 is first distributed to the power conversion equipment and then to the distribution modules 170 connected to each of the low power equipment loads 50 with multiple twisted and shielded electrical conductors where the conductors carry essentially equal but opposite currents. In application there may be small differences in current carried by the conductors. For example, twisted and shielded electrical conductor pair 314 includes an electrical power conductor 310 and a neutral or return conductor 312. The neutral conductor may be routed with a three-phase power feeder.

After converting the primary power 506, AC power is distributed from each ATU 138 to AC equipment loads 50*a* with an electrical power conductor 310 and current is returned from each AC equipment load 50*a* on a corresponding return conductor 312 of the twisted and shielded electrical conductor pair 314. DC power is provided from each TRU 134 to the DC equipment loads 50*b* with electrical power conductor 310. Current is returned from each DC equipment load 50*b* on the corresponding return conductor 312 of the twisted electrical conductor pair.

Phase A power 506*a*, phase B power 506*b*, and phase C power 506*c* are distributed from the generators 34, 36. A fourth wire from the generators 34, 36 for the three-phase primary power 506 is also depicted that is the neutral conductor 506*d*. Each of the AC equipment loads 50*a* includes a shield termination wire 590 depicted by a broken line connected to the neutral conductor 506*d* and each of the DC equipment loads 50*b* includes a shield termination wire 592 also depicted by a broken line connected to the neutral conductor 506*d*. Although each of the equipment loads 50*a* and 50*b* are connected to the neutral conductor 506*d* with shield termination wires 590 and 592, respectively, the load return currents are no longer cumulative. In FIG. 16, part of the neutral conductor 506*d* is configured to appear as a current return network (CRN) merely to illustrate that the voltage differential is zero as a result of using small loops of twisted wire conductor pairs for localized secondary power distribution. The neutral conductor 506*d* of the distributed three-phase primary power 506 between MECs 44, 46, 48 of the aircraft 10, which is much smaller than conductors that would typically be utilized as part of a CRN, may simply be referred to as a safety ground bus (SGB). Therefore, a CRN is no longer needed in the composite aircraft 10 with localized secondary power distribution provided by twisted wire conductor pairs. The twisted wire conductor pair now provides current return. Also, the cross-sectional area of the loops created by the twisted conductor pair is much smaller than the cross-sectional area created by the larger wire loop of the CRN which reduces the lighting threat to the composite aircraft 10. For comparison, the conductors of the twisted pair may be about 16 to about 20 American wire gauge (AWG) whereas the conductors of the CRN are about 2 AWG or larger diameter.

FIG. 16 also illustrates the distribution of primary power from generators 34, 36 among primary MECs 44 distributed within the forward, mid and aft sections of the aircraft 10. Each primary MEC 44 includes a TRU 134 and an ATU 138 for servicing equipment loads 50b and equipment loads 50a, respectively, as described above. Power is distributed from each MEC 44 to each equipment load 50 with a twisted and shielded electrical conductor pair 314. FIG. 16 also depicts a pair of MECs 44 providing 230 VAC for auxiliary loads 520. As referenced in FIGS. 12A-12C and the accompanying text, 230 VAC power to and from the auxiliary loads is controlled by the contactors 232, 278 of the PPSNDs 302 of the primary MEC 44.

FIG. 16 also illustrates a plurality of LRUs 52, such as avionics, serviced by the forward most primary MEC 44. FIG. 16 also illustrates a battery 598 for providing standby power. Although FIG. 16 depicts the battery 598 providing standby power to only the forward most primary MEC 44, battery standby power is preferably provided to all primary MECs 44.

FIG. 17 illustrates an integrated truss system 600 which may be used in aircraft manufacturing for providing one or more power and data transfer paths as explained above. One or more MECs 44, 46, 48 may include the truss system 600 as a support or mounting structure for attaching all or part of vehicle systems, components of a MEC 44, 46, 48, equipment loads 50, LRUs 52, or other equipment.

The mounting structure of the truss system 600 may be a multi-part or modular assembly of separate structural elements that stack, detachably connect or lock together to create an integrated mounting structure that may be installed in an aircraft 10 as a single unitary piece. Each structural element may have one or more transfer layers and one or more insulation layers as described above. Each structural element of the multi-part truss system 600 may be detachable from one another to allow repair or replacement of damaged structural elements without removing undamaged structural elements from the aircraft 10. One or more layers of each structural element may also be replaced. One element of the truss system 600 could be swapped out without having to remove the entire truss system 600. Also, all or at least a portion of the truss system 600 may also be detachable from the support structure of the aircraft 10 such as the floor beams or fuselage frame members. Alternatively, the truss system 600 may be manufactured as a single monolithic structure which may be installed or replaced in it's entirely. The truss system 600 is configured to extend within a thin structural volume defined in the sidewall of the fuselage between frame members, and by the depth of the frame members, or in the space in the floor between the passenger and cargo compartments of the aircraft 10, and by the depth of the floor beams. Alternately, a truss such as truss system 600 could have a physical form configured to be implemented within a traditional equipment bay. The truss system 600 mounted in the sidewall of the aircraft 10 preferably corresponds with the curvature of the fuselage of the aircraft 10. FIG. 17 is a bottom view looking upward toward the truss system 600 configured to extend from sidewall to sidewall of the aircraft 10, under seat rails 610, and between transverse floor beams 608. A MEC 44, 46, 48 positioned in the floor or in the sidewall of the aircraft 10 with a truss system such as truss system 600 can service the equipment loads 50 within the passenger compartment and in the cargo compartment of the aircraft 10 that are in proximity of the MEC 44, 46, 48.

The truss system 600 is configured to have a narrow middle portion that extends over the top of two inner adjacent floor beams 608 and opposite end portions that extend further outward from both sides of the two inner adjacent floor beam 608 to the next floor beams 608 to provide a wide surface for mounting components such as the power distribution modules 170. In one or more embodiments, the truss system is configured to have a width and length between adjacent floor beams 608, or between floor beams 608 that are displaced from one another, that is suitable for serving as a smoke barrier for obstructing smoke from the cargo compartment from entering the passenger compartment and/or as a water drip barrier for obstructing water from the passenger compartment from dripping into the cargo compartment.

FIG. 17 also shows the CNI module 162, power distribution modules 170, TRUs 134, 142, the ATU 138, and the PPSNDs 302 mounted to the truss system 600 of a primary MEC 44. The TRU 134 receives 230 VAC from the output connections 390 of the PPSNDs 302. The TRUs 134 connect to a power bus with 28 VDC to power the distribution modules 170. Each power distribution module 170 has connections 596 for interfacing with the equipment loads 50 associated with the primary MEC 44.

Each structural element of the truss system 600 has one or more transfer and insulation layers as explained above. One of the transfer layers may be configured to transfer high voltage power from one portion of a MEC 44, 46, 48 to another portion of that same MEC 44, 46, 48. For example, high voltage power may be provided inside the truss system 600 across a transfer layer to the PPSNDs 302, configured as an LRU 52, mounted to the surface of truss system 600. Low voltage secondary power may also be provided through another transfer layer of the truss system 600 to low power equipment loads 50 mounted to the surface of the truss system 600. Also, communication data can be provided across a transfer layer of the truss 600 to an aircraft system component mounted to the surface of the truss system 600. One transfer layer of the truss system 600 could provide channel A to a system component mounted to the surface of the truss system 600 and another transfer layer could provide channel B to that same system.

One or more configurations of the aircraft 10 may include one or more remote MECs (RMECs) 410 configured for use with power and data elements in specific environments of the aircraft 10. An RMEC 410 is a simpler version of a primary or secondary MEC 44, 46 that does not have power conversion equipment such as TRUs 134, 142, or the ATU 138. Any of the MECs 44, 46, 48 can source an RMEC 410 with secondary power. One or more discrete secondary power inputs are provided to the RMEC 410, from one or more power distribution modules 170 of the nearest primary or secondary MEC 44, 46, at a specific voltage for a load associated with that RMEC 410. AC power could also be provided to the RMEC 410 directly from a PPSND 302, if required for a load of a local subsystem.

Each RMEC 410 distributes secondary power and communication for providing localized power and performing computing functions specifically for the local equipment and components of the aircraft system in proximity of the RMEC 410. Because RMECs 410 distribute discrete secondary power and do not include power conversion equipment, the amount of wiring is reduced between the local sensors and components and the MECs 44, 46. This reduces overall aircraft wire weight and wire complexity throughout the aircraft 10 which expedites assembly of the aircraft 10. Also, build verification is simplified and final assembly of the aircraft is expedited because the RMEC 410 may be packaged together with devices, configured to provide data and receive commands and power from the RMEC 410, into a unitary system, such as a passenger entry door system or a main landing gear system, that can be production qualified prior to or immediately after installation within the aircraft 10.

RMECs 410 may be used in the pressurized areas as well as the unpressurized areas of the aircraft 10. RMECs 410 can route communications from outside a pressurized portion of the aircraft to a pressurized portion of the aircraft. For example, RMECs 410 may be used in the nose and main wheel well areas with the landing gear system, nose wheel steering system, brake system, and hydraulic systems. RMECs 410 may also be used in the passenger entry and cargo door areas with the door indication system, flight look system, emergency power, and the forward or aft cargo door systems. RMECs 410 could also be used in the wing and engine areas with the engine data concentrator system and the wing flap and slat system. Other areas where RMECs 410 may be used are the cabin areas for the lavatory, galley, lighting, and passenger seat power systems. RMECs 410 may be used in the flight deck areas with panel components and window heat system and the cargo compartment areas with the forward and aft cargo handling systems. RMECs 410 may also be used in the environmental control and cooling systems.

Figure 18:
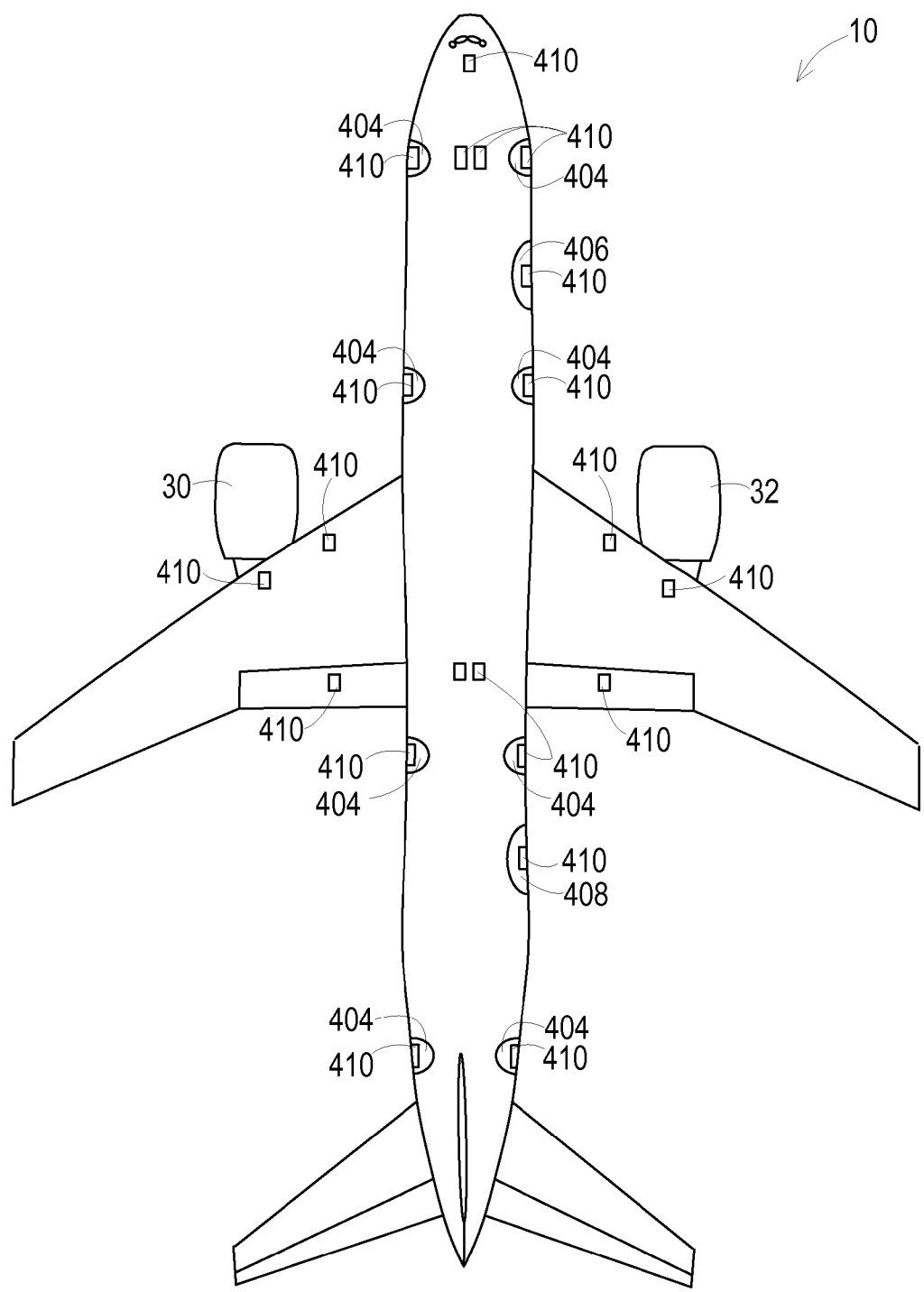
FIG. 18 illustrates one configuration of an aircraft having remote MECs (RMECs) throughout the aircraft in the pressurized and unpressurized portions of the aircraft according to at least one embodiment disclosed herein.

As shown in FIG. 18 one or more configurations of the aircraft 10 includes an RMEC 410 with each of the passenger entry door systems 404, with the forward cargo door system 406 and the aft cargo door system 408, a pair of RMECs 410 for the two nose wheel systems, a pair of RMECs 410 for the two main wheel well systems, an RMEC 410 for the panel in the cockpit, RMECs 410 for the left and right main engine data concentrators, RMECs for the left and right wing slats, and RMECs 410 for the left and right wing flaps.

Figure 19:
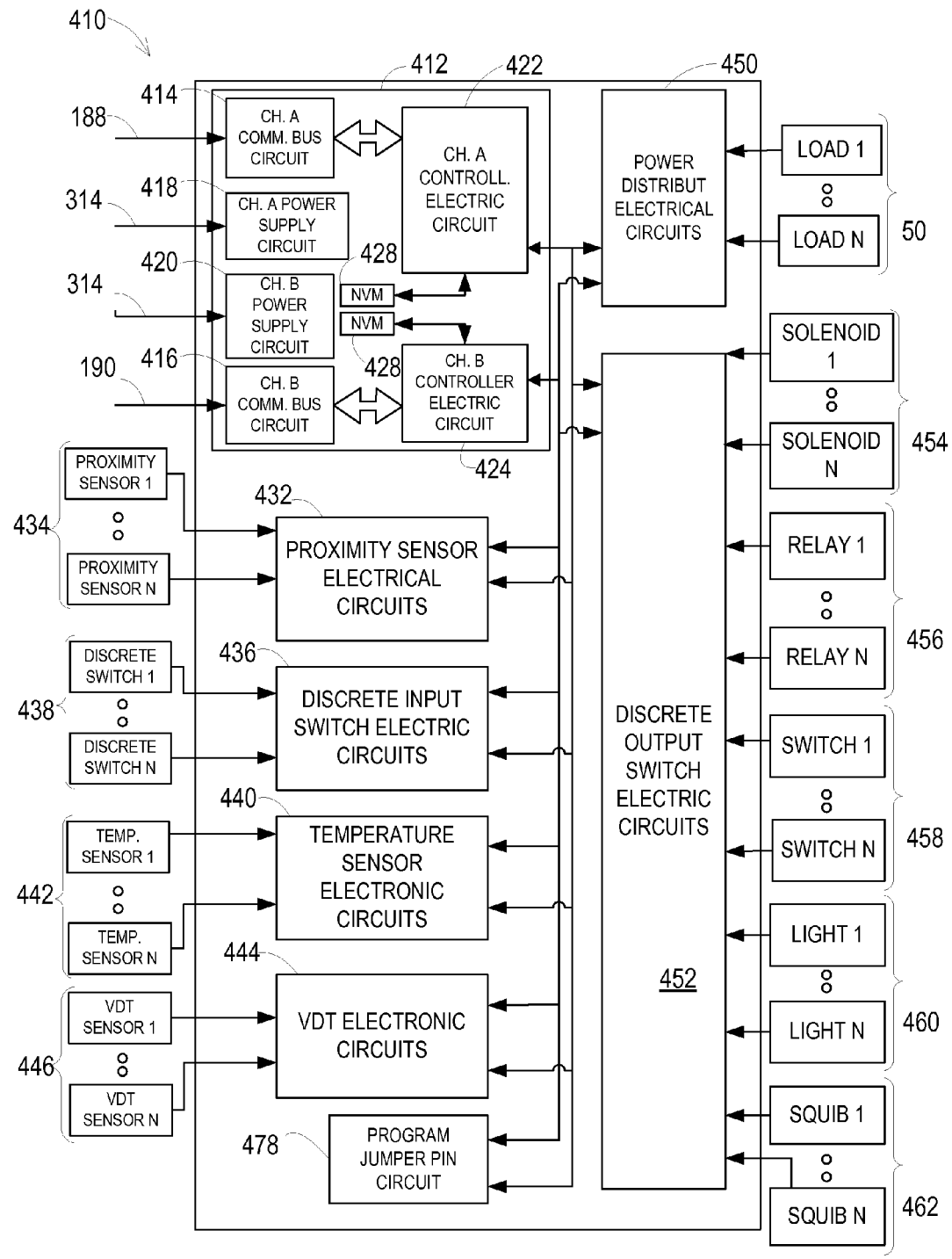
FIG. 19 illustrates one configuration of a block diagram of an RMEC having a fault-tolerant power and communication system and that is customizable based on the needs of an aircraft subsystem according to at least one embodiment disclosed herein.

FIG. 19 illustrates a block diagram of RMEC 410 having a fault-tolerant power and communication system 412. The RMEC 410 is customizable based upon the needs of an aircraft subsystem in proximity of the RMEC 410. All the electrical circuits along with the power into the RMEC 410 may be housed in a LRU 52. Sensors and other components of a particular local subsystem then interface with the LRU 52 of the RMEC 410 to prevent numerous penetrations of wire bundles back into the pressurized vessel of the aircraft 10. The wires associated with any sensors or components of the local subsystem are kept in proximity of the RMEC 410 by directly interfacing with the RMEC 410 rather than penetrate back into the pressurized vessels of the aircraft 10. Preferably, there is no direct power or data path between the devices on the exterior of the pressurized vessel and within the zone of an associated RMEC 410 to a MEC 44, 46, 48. A concentrator configured to combine data from multiple sources in an associated zone of an RMEC 410 onto a single path may be used to minimize the size of the penetration into a pressurized portion of the aircraft 10. For example, only A and B data channels 188, 190 and two twisted and shielded electrical conductor pairs 314 penetrate a pressurized portion of the aircraft 10 to provide bi-directional communication and secondary power to the RMEC 410. The RMEC 410 routes communications from outside a pressurized portion of the aircraft 10 to a pressurized portion of the aircraft 10. The RMEC 410 interfaces with either a primary MEC 44 or a secondary MEC 46 for secondary DC power distributed by two twisted and shielded electrical conductor pairs 314 connected to the same or different distribution modules 170 of the same primary or secondary MEC 44, 46.

Channel A and B communication data from the CNI module 162 of the MEC 44, 46 is received at communication bus electronic circuits 414, 416 and the two twisted and shielded electrical conductor pairs 314 provide 28 VDC or 115 VAC to power supply circuits 418, 420. Channel A and B multi-core microcontroller electronic circuits 422, 424 with non-volatile memory 428 receive and process communication data for digitally controlling the sensors and other components interfaced with other electronic circuits within the RMEC 410. If one of the microcontrollers 422, 424 has an operational inconsistency, the other of the microcontrollers 422, 424 takes over with no loss of function or data.

Whether the communications from the RMECs 410 are time sensitive may determine whether an RMEC 410 communicates with a primary MEC 44 or a secondary MEC 46. If the communications associated with the equipment loads of an RMEC 410 are time sensitive then it is preferable that the RMEC 410 communicates the time sensitive communication data to a primary MEC 44. If the communications from an RMEC 410 are not time sensitive then the RMEC 410 can communicate the non-critical communication data to a secondary MEC 46. Therefore, time sensitive communication data from one or more of the RMECs may be routed to the primary MEC and other than time sensitive communication data from one or more RMECs may be routed to the secondary MEC. An example of a time sensitive communication is whether the landing gear is up within a period of time for obstacle clearance at the end of a short runway. An example of communications that are not time sensitive is when passenger conveniences have failed. The communications between a MEC 44, 46 to the RMEC 410 can be accomplished either by CAN, ARINC 664, Ethernet, Flexray or some other bus architecture.

Electronic circuits that may also be included in one or more configurations of the RMEC 410 are proximity sensor electronic circuits 432 for interfacing with proximity sensors 434, discrete input switch electronic circuits 436 for interfacing with discrete switches 438, temperature sensor electronic circuits 440 for interfacing with temperature sensors 442, and variable differential transformer electronic circuits 444 interfacing with variable differential transformers (VDT) 446 for determining positions of devices such as motors of the local subsystem.

FIG. 19 also illustrates one or more power distribution electrical circuits 450 of the remote MEC 410 for providing DC or AC power to loads 50, solenoids 454, relays 456, switches 458, lights 460, or squibs 462. However, the use and number of loads 50, solenoids 454, relays 456, switches 458, lights 460, or squibs 462 depends on the configuration and location of the subsystem for each remote MEC 410. To complete the circuits, the remote MEC 410 also includes one or more discrete output switch electrical circuits 452 for providing grounded return path outputs. All the wiring for the loads 50, solenoids 454, relays 456, switches 458, lights 460, or squibs 462 is local to the RMEC 410.

Figure 20A:
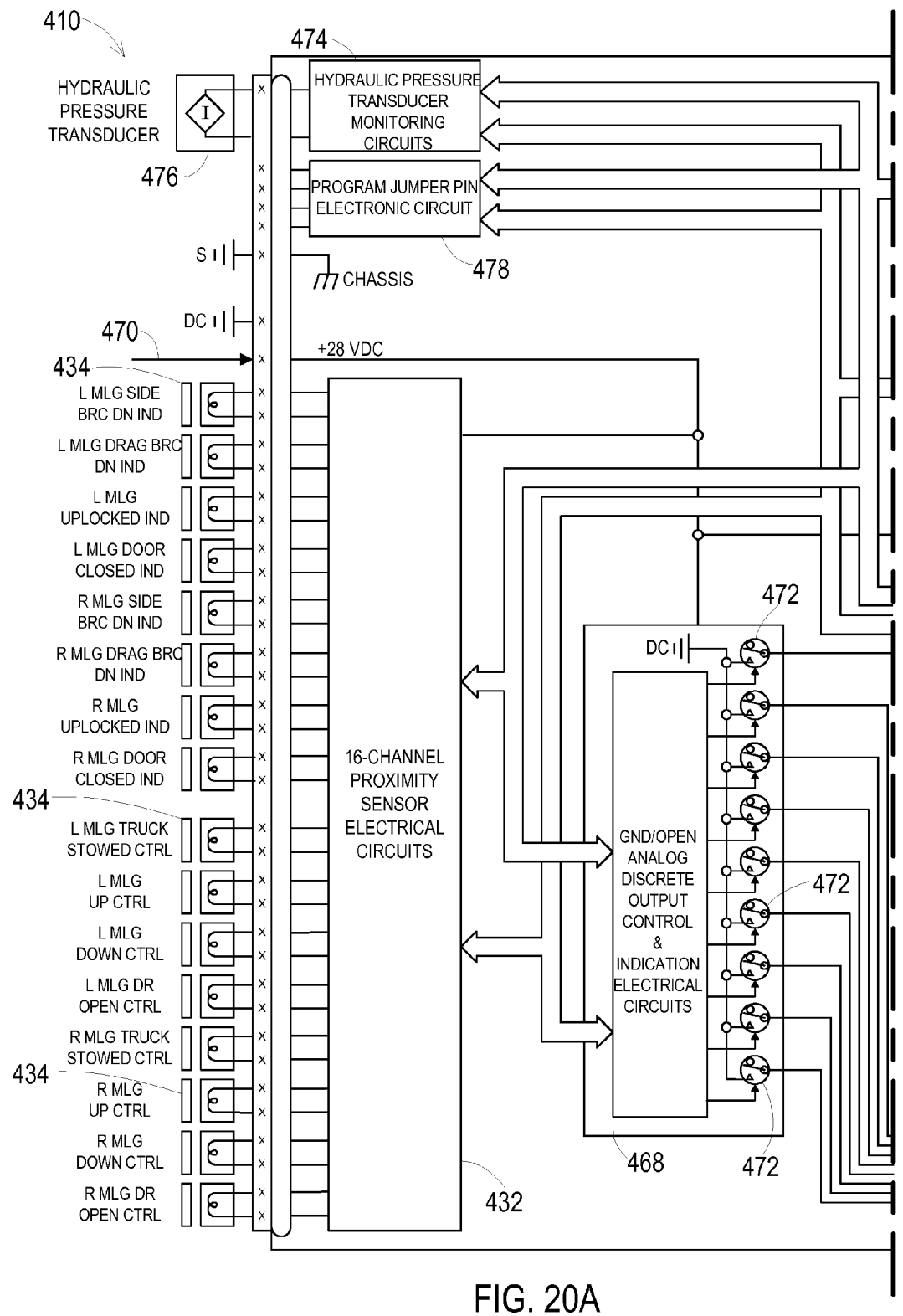
FIGS. 20A and 20B illustrate one configuration of an RMEC for a landing gear control and indication system according to at least one embodiment disclosed herein.
Figure 20B:
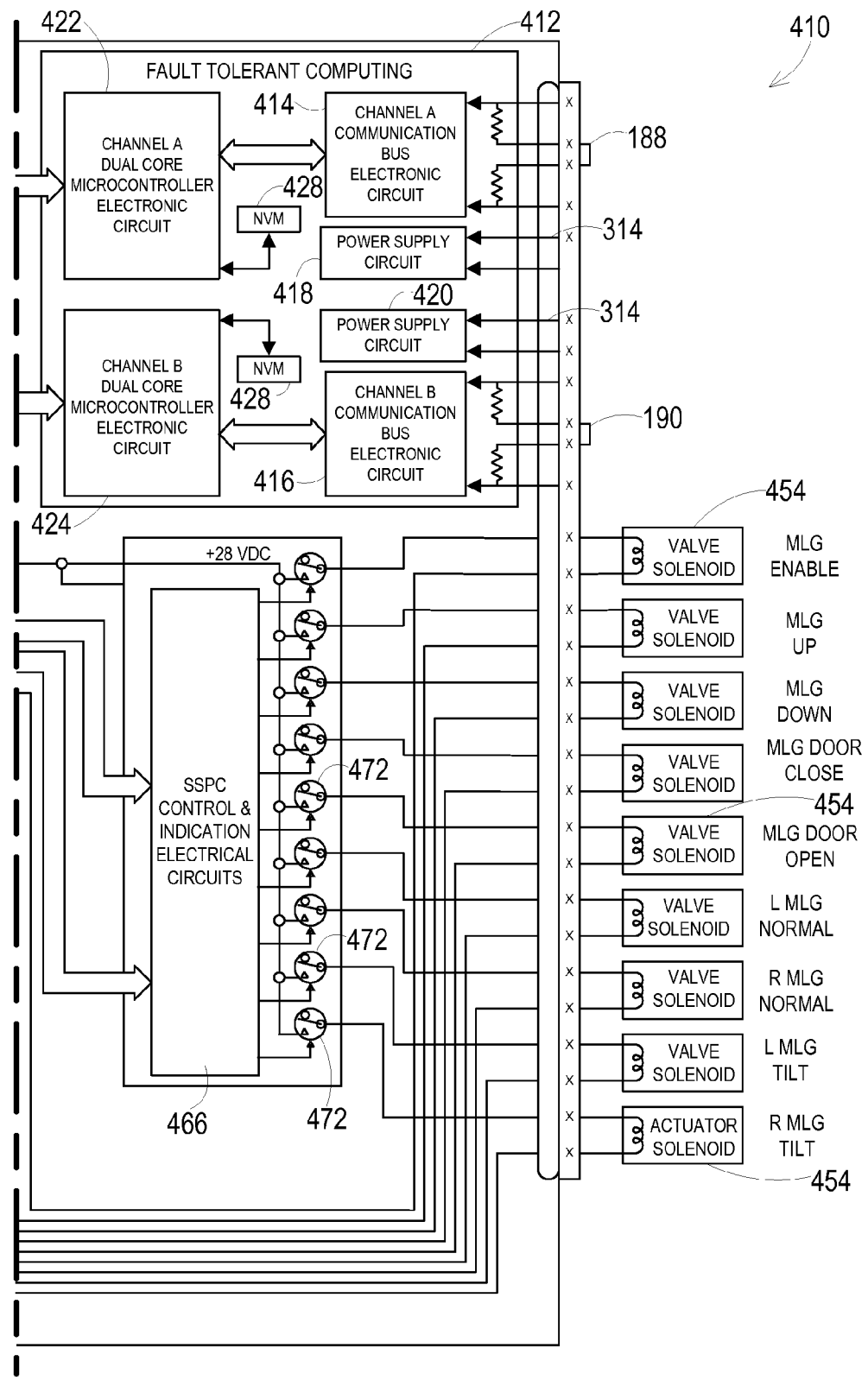

FIGS. 20A and 20B illustrate a block diagram of one or more configurations for a RMEC 410 for a main landing gear control and indication system. The RMEC 410 and the main landing gear system interfacing with the RMEC 410 are positioned outside the pressurized vessel of the aircraft 10. The RMEC 410 of FIGS. 20A and 20B includes the fault tolerant computing system 412 with redundant communication and power channels as well as proximity sensor electrical circuits 432. Solenoids 454 on the right side of the MEC 410 interface with one or more solid state power control and indication electrical circuits 466 and one or more ground/open analog discrete output control and indication electrical circuits 468. Both the solid state power controller and indication circuits 466 and the ground/open analog discrete output control and indication electrical circuits 468 receive a power input 470, for example 28 VDC from a power distribution module 170 of a MEC 44, 46, to supply power through switches 472 to the solenoids 454. When the logic of the switches 472 is correct both power and ground is supplied to the solenoids 454 to open and close the landing gear door and enable, tilt, raise up and down the land gear. One or more hydraulic pressure transducer electronic circuits 474 for monitoring a hydraulic pressure transducer 476 may also be included for indicating when hydraulic lines of the landing gear system are pressurized. A program jumper pin electronic circuit 478 of the RMEC 410 changes the configuration of the aircraft subsystem by adding or removing jumpers.

Figure 21A:
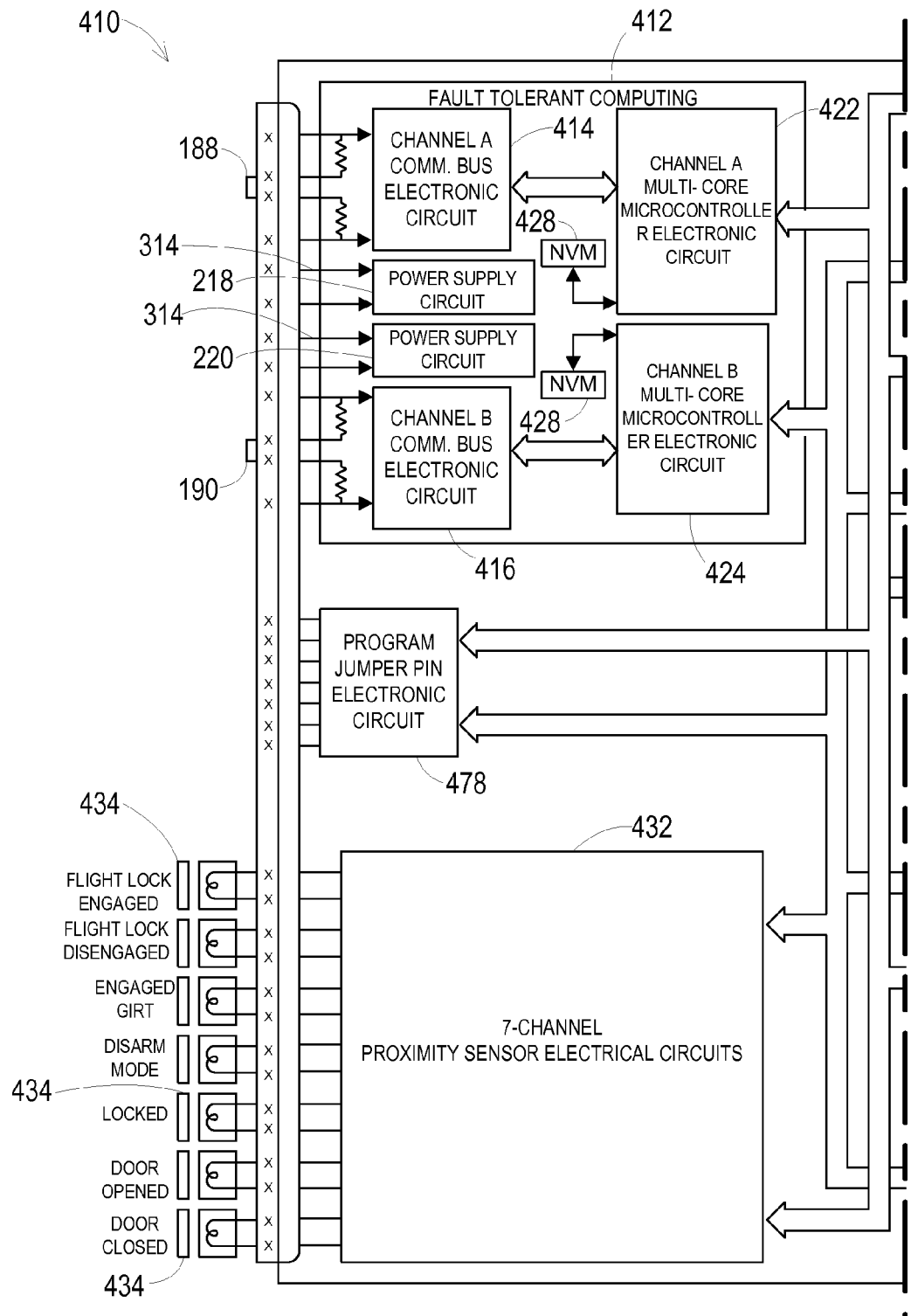
FIGS. 21A and 21B illustrate one configuration of an RMEC on a passenger entry door of a passenger entry door system according to at least one embodiment disclosed herein.
Figure 21B:
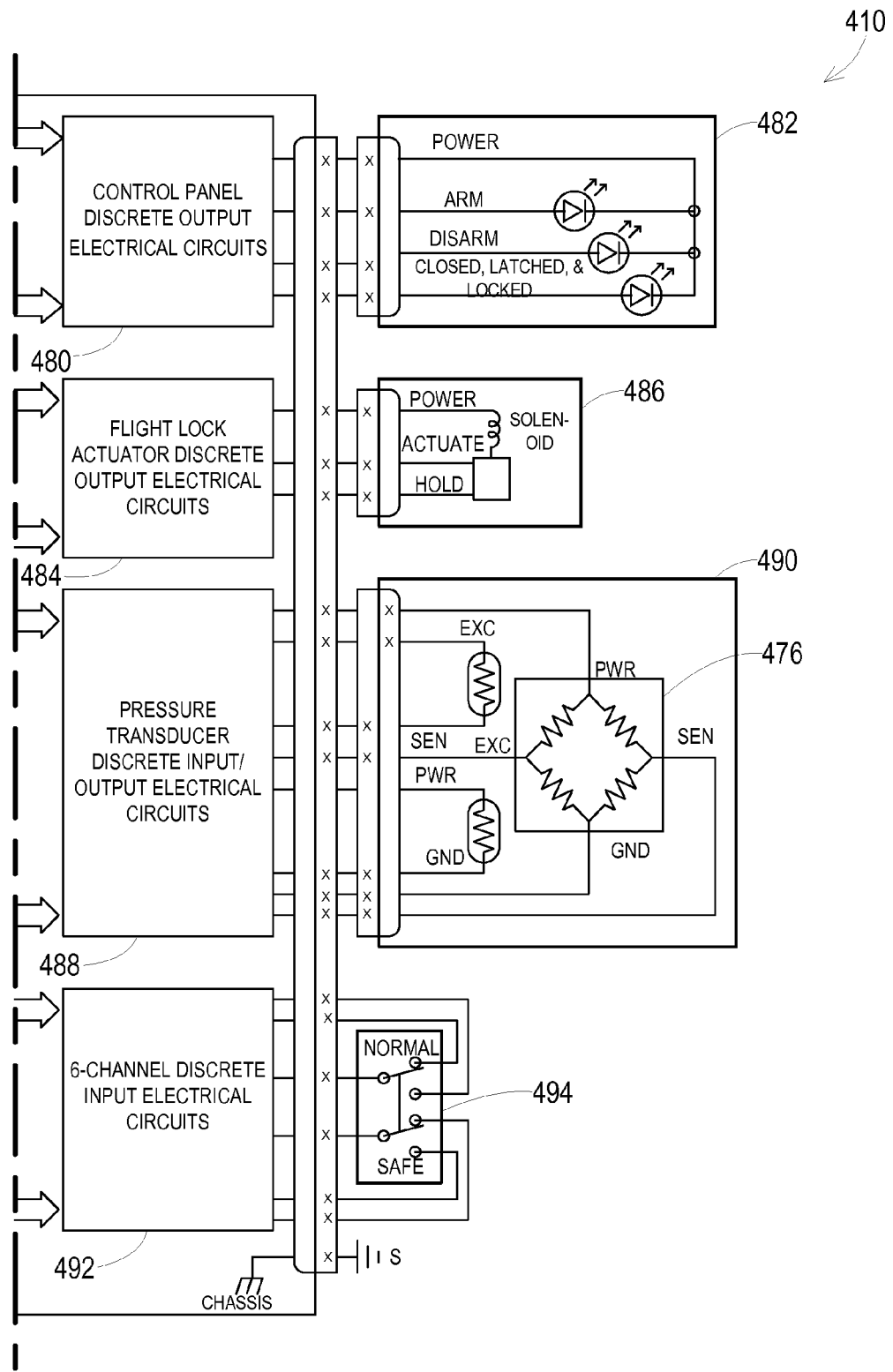

FIGS. 21A and 21B illustrate a block diagram of one or more configurations for a RMEC 410 for use on a passenger entry door of a passenger entry door system 404. The RMEC 410 and the passenger entry door system 404 interfacing with the RMEC 410 are positioned inside the pressurized vessel of the aircraft 10. The RMEC 410 of FIGS. 21A and 21B also includes the fault tolerant computing system 412 with redundant communication and power channels as well as proximity sensor electrical circuits 432. Proximity sensors 434 indicate the state of the position of the passenger entry door system 404.

Proximity sensors 434 and proximity sensor electronic circuits 432 on the left side of the MEC 410 interface with one or more control panel discrete output electronic circuits 480 with a passenger entry door control panel 482 for indicating when the passenger entry door is closed, latched, and locked, one or more flight lock actuator discrete output electronic circuits 484 with a flight lock actuator 486, one or more pressure transducer discrete input/output electron circuits 488 with a pneumatic reservoir 490 having excitation, sensing, power and ground lines and a hydraulic pressure transducer 476, and one or more discrete input electronic circuits for a passenger entry door switch 494. All the wiring for the passenger entry door 482, flight lock actuator 486, pneumatic reservoir 490 and the passenger entry door switch 494 is within the passenger entry door system 404 and local to the RMEC 410.

Figure 22:
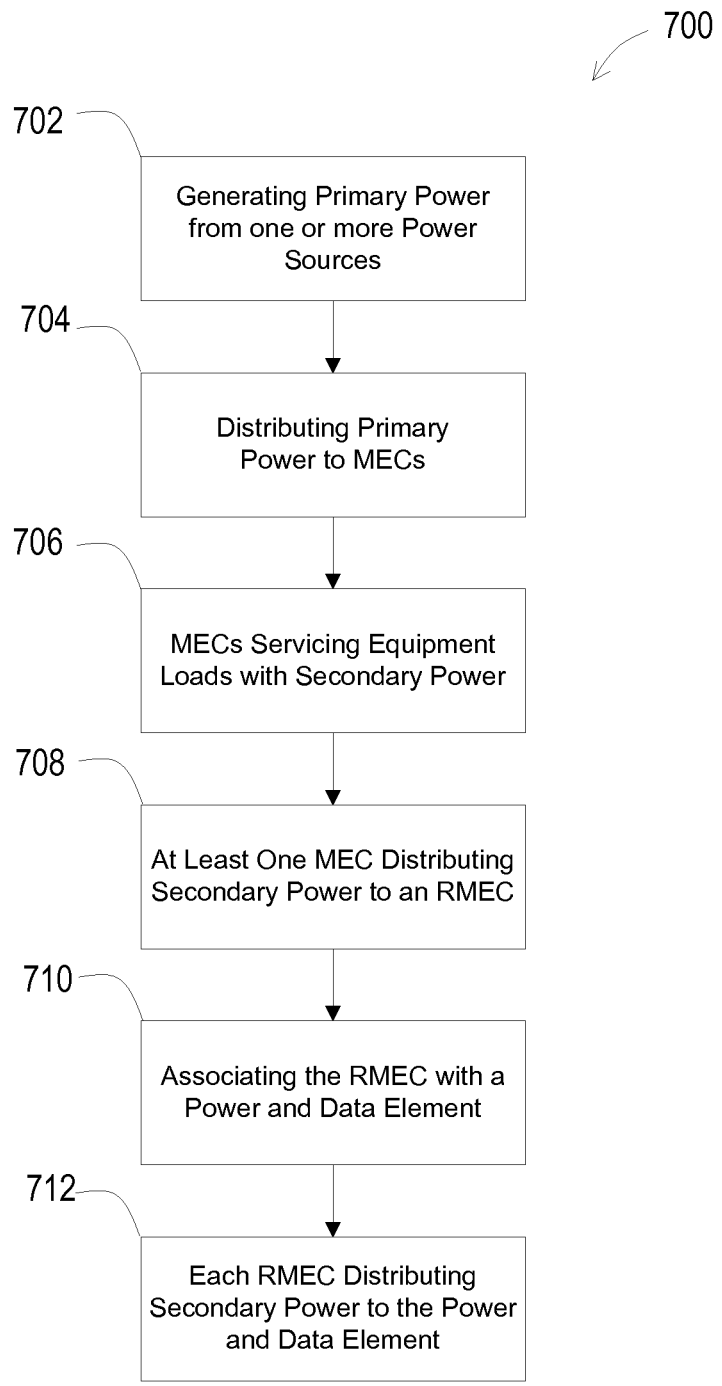
FIG. 22 illustrates one configuration of a routine for providing power and data to remote power and data elements of a vehicle according to at least one embodiment disclosed herein.

Turning now to FIG. 22, an illustrative routine 700 for providing power and data to remote power and data elements of a vehicle is provided. Unless otherwise indicated, more or fewer operations may be performed than shown in the figures and described herein. Additionally, unless otherwise indicated, these operations may also be performed in a different order than those described herein.

The routine 700 starts at operation 702, where one or more power sources generate primary power. Operation 704 includes distributing primary power to the MECs 44, 46, 48. In operation 706 each MEC 44, 46, 48 services equipment loads 50 with secondary power. In operation 708 at least one MEC 44, 46, 48 distributes secondary power to an RMEC 410. Operation 710 includes associating the RMEC 410 with one or more power and data elements. In operation 712, each RMEC 410 distributes secondary power to the one or more power and data elements.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A distributed power and communications system for a vehicle, the system comprising:
   a plurality of modular equipment centers (MECs) spatially distributed throughout the vehicle, each of the plurality of MECs providing electrical power and communication data for independently servicing equipment loads; and
   a plurality of remote modular equipment centers (RMECs) distributed throughout the vehicle, wherein each RMEC of the plurality of RMECs is positioned and associated with a zone of one or more power and communication data elements in proximity of the RMEC, wherein each RMEC is configured to:
      receive electrical power and communication data from a proximally closest MEC of the plurality of MECs,
      distribute the received electrical power to and collect data from, the one or more power and communication data elements of the associated zone, and
      route communications to a selected one of the plurality of MECs based on a time-sensitivity of the communications.

2. The system of claim 1, wherein each MEC of the plurality of MECs:
   independently receives primary power from one or more primary power sources, and
   independently provides secondary electrical power to at least one of the plurality of RMECs to service equipment loads within the associated zone of the RMEC.

3. The system of claim 1, wherein the plurality of RMECs communicate with one or more of the plurality of MECs distributed throughout the vehicle.

4. The system of claim 1, wherein the plurality of MECs comprises at least one primary MEC and at least one secondary MEC, and wherein time-sensitive communication data from one or more of the plurality of RMECs is routed to the primary MEC and other-than-time-sensitive communication data from one or more of the plurality of RMECs is routed to the secondary MEC.

5. The system of claim 1, wherein the vehicle is an aircraft, and wherein at least one of the plurality of RMECs is housed within a line-replaceable unit (LRU) of the aircraft.

6. The system of claim 1, wherein at least one of the plurality of RMECs and at least one of the power and communication data elements are included within a subsystem of the system, the subsystem being production-qualified prior to installation of the subsystem within the vehicle.

7. The system of claim 1, wherein at least one of the plurality of RMECs is positioned in a wheel well of the vehicle.

8. The system of claim 1, wherein the vehicle comprises a plurality of vehicle sections that are coupled together to define a vehicle body having one or more section breaks between adjacent vehicle sections, wherein the vehicle body defines one or more pressurized portions and one or more unpressurized portions, wherein at least one RMEC of the plurality of RMECs is positioned within the one or more unpressurized portions.

9. The system of claim 8, wherein at least one other RMEC of the plurality of RMECs is positioned within the one or more pressurized portions of the vehicle.

10. The system of claim 9, wherein the at least one other RMEC positioned within the one or more pressurized portions interfaces with one or more power and communication data elements of a passenger entry door subsystem.

11. The system of claim 8, wherein the at least one RMEC positioned within the one or more unpressurized portions communicate with one or more of the plurality of MECs that are disposed inside the one or more pressurized portions.

12. The system of claim 8, wherein the at least one RMEC positioned within the one or more unpressurized portions comprises a concentrator configured to combine data from multiple power and communication data elements in an associated zone in order to minimize a size of a penetration into the one or more pressurized portions.

13. The system of claim 8, wherein no direct power path and no direct data path exists between power and communication data elements outside of positioned within the one or more unpressurized portions and one or more MECs disposed inside the one or more pressurized portions due to the at least one RMEC.

14. An aircraft having a distributed power and communications system, the aircraft comprising:
   a line-replaceable unit (LRU) housing a remote modular equipment center (RMEC), the LRU receiving secondary electrical power and communication data from a first modular equipment center (MEC) to service the RMEC, the LRU positioned within a zone of one or more power elements and one or more data elements in proximity of the LRU,
   wherein the RMEC is configured to:
      distribute the secondary electrical power to the one or more power elements and to collect data from the one or more data elements of the zone, and
      selectively route communications to the first MEC based on a time-sensitivity of the communications.

15. The aircraft of claim 14, further comprising a second MEC, wherein the RMEC is configured to route time-sensitive communications to the first MEC and to route other-than-time-sensitive communications to the second MEC.

16. A method for providing power and data to remote power and data elements of a vehicle, the method comprising:
   distributing primary power to a plurality of modular equipment centers (MECs) distributed throughout the vehicle;
   distributing, to a remote modular equipment center (RMEC) disposed within the vehicle, secondary power from a proximally closest MEC of the plurality of MECs, the RMEC associated with one or more power and data elements in proximity of the RMEC; and
   distributing the secondary power to the one or more power and data elements associated with the RMEC; and
   routing communications from the RMEC to a selected one of the plurality of MECs based on a time-sensitivity of the communications.

17. The method of claim 16, wherein the MEC providing secondary power from the RMEC is positioned in an unpressurized portion of the vehicle.

18. The method of claim 16, wherein the RMEC and the one or more power and data elements are included within a subsystem of the vehicle, the subsystem being production-qualified prior to installation within the vehicle.

19. The method of claim 16, wherein the plurality of MECs comprises a primary MEC and a secondary MEC, wherein routing communications from the RMEC comprises:
   routing time-sensitive communications from the RMEC to the primary MEC; and
   routing other-than-time-sensitive communications from the RMEC to the secondary MEC.

20. The method of claim 16, further comprising:
   routing communications, using the RMEC, from outside a pressurized portion of the vehicle to inside of a pressurized portion of the vehicle.

* * * * *

UNITED STATES PATENT AND TRADEMARK OFFICE
CERTIFICATE OF CORRECTION

PATENT NO. : 9,533,636 B2  
APPLICATION NO. : 14/052450  
DATED : January 3, 2017  
INVENTOR(S) : Todd B. Brouwer et al.

Page 1 of 1

It is certified that error appears in the above-identified patent and that said Letters Patent is hereby corrected as shown below:

In the Claims

In Column 30, Line 18, in Claim 1, after "to" insert -- , --.

In Column 30, Line 63, in Claim 9, delete "portions of the vehicle." and insert -- portions. --, therefor.

In Column 31, Line 14, in Claim 13, after "elements" delete "outside of".

In Column 32, Line 11, in Claim 16, after "RMEC;" delete "and".

Signed and Sealed this  
Sixth Day of June, 2017

Michelle K. Lee  
*Director of the United States Patent and Trademark Office*